United States Patent
Hicks, III

(10) Patent No.: US 10,453,316 B2
(45) Date of Patent: *Oct. 22, 2019

(54) METHODS, SYSTEMS, AND PRODUCTS FOR SECURITY SERVICES

(71) Applicant: AT&T Intellectual Property I, L.P., Atlanta, GA (US)

(72) Inventor: John Alson Hicks, III, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,179

(22) Filed: Mar. 16, 2018

(65) Prior Publication Data

US 2018/0204434 A1    Jul. 19, 2018

Related U.S. Application Data

(63) Continuation of application No. 15/081,982, filed on Mar. 28, 2016, now Pat. No. 9,953,500, which is a
(Continued)

(51) Int. Cl.
*G08B 13/196* (2006.01)
*G08B 25/00* (2006.01)
(Continued)

(52) U.S. Cl.
CPC . *G08B 13/19697* (2013.01); *G08B 13/19656* (2013.01); *G08B 25/001* (2013.01); *G08B 25/009* (2013.01); *G08B 25/014* (2013.01); *G08B 25/06* (2013.01); *G08B 25/08* (2013.01); *G08B 25/10* (2013.01); *H04N 7/181* (2013.01); *G08B 13/19667* (2013.01); *G08B 13/19686* (2013.01); *G08B 25/14* (2013.01); *G08B 29/14* (2013.01)

(58) Field of Classification Search
CPC ........ G08B 13/19656; G08B 13/19667; G08B 13/19686; G08B 13/19697; G08B 25/001; G08B 25/009; G08B 25/014; G08B 25/06; G08B 25/08; G08B 25/10; G08B 25/14; G08B 29/14; H04N 7/181
See application file for complete search history.

(56) References Cited

U.S. PATENT DOCUMENTS

| 4,259,548 A | 3/1981 | Fahey et al. |
| 6,038,289 A | 3/2000 | Sands |

(Continued)

FOREIGN PATENT DOCUMENTS

| JP | 2014216663 A | 11/2014 |
| KR | 20070105430 A | 10/2007 |

OTHER PUBLICATIONS

Aedo, Ignacio, et al., "Personalized Alert Notifications and Evacuation Routes in Indoor Environments," *Sensors* 12.6 (2012): 7804-7827, 24 pages.

*Primary Examiner* — Omeed Alizada
(74) *Attorney, Agent, or Firm* — Scott P. Zimmerman, PLLC

(57) ABSTRACT

A sensor associated with a security system determines an electrically open circuit. An identifier identifies the open circuit, which may then be used to retrieve video data trained to a surveillance area associated with the sensor.

20 Claims, 45 Drawing Sheets

Related U.S. Application Data continuation of application No. 13/293,213, filed on Nov. 10, 2011, now Pat. No. 9,396,634.

(51) Int. Cl.

| | | |
|---|---|---|
| *G08B 25/01* | (2006.01) | |
| *G08B 25/06* | (2006.01) | |
| *G08B 25/08* | (2006.01) | |
| *G08B 25/10* | (2006.01) | |
| *H04N 7/18* | (2006.01) | |
| *G08B 25/14* | (2006.01) | |
| *G08B 29/14* | (2006.01) | |

(56) References Cited

U.S. PATENT DOCUMENTS

| | | |
|---|---|---|
| 6,067,346 A | 5/2000 | Akhteruzzaman et al. |
| 6,271,752 B1 | 8/2001 | Vaios |
| 6,356,058 B1 | 3/2002 | Maio |
| 6,400,265 B1 | 6/2002 | Saylor et al. |
| 6,504,479 B1 | 1/2003 | Lemons |
| 6,636,489 B1 | 10/2003 | Fingerhut |
| 6,658,091 B1 | 12/2003 | Naidoo et al. |
| 6,693,530 B1 | 2/2004 | Dowens et al. |
| 6,741,171 B2 | 5/2004 | Palka et al. |
| 6,778,085 B2 | 8/2004 | Faulkner |
| 6,829,478 B1 | 12/2004 | Layton et al. |
| 6,884,826 B2 | 4/2005 | Le-Khac et al. |
| 6,914,896 B1 | 7/2005 | Tomalewicz |
| 6,970,183 B1 | 11/2005 | Monroe |
| 6,975,220 B1 | 12/2005 | Foodman et al. |
| 6,977,585 B2 | 12/2005 | Falk et al. |
| 7,015,806 B2 | 3/2006 | Naidoo et al. |
| 7,020,796 B1 | 3/2006 | Ennis et al. |
| 7,035,650 B1 | 4/2006 | Moskowitz et al. |
| 7,113,090 B1 | 9/2006 | Saylor et al. |
| 7,239,689 B2 | 7/2007 | Diomelli |
| 7,248,161 B2 | 7/2007 | Spoltore et al. |
| 7,249,370 B2 | 7/2007 | Kodama |
| 7,295,119 B2 | 11/2007 | Rappaport et al. |
| 7,323,980 B2 | 1/2008 | Faulkner et al. |
| 7,409,045 B2 | 8/2008 | Naidoo |
| 7,492,253 B2 | 2/2009 | Ollis et al. |
| 7,515,041 B2 | 4/2009 | Eisold et al. |
| 7,633,385 B2 | 12/2009 | Cohn et al. |
| 7,679,507 B2 | 3/2010 | Babich et al. |
| 7,688,203 B2 | 3/2010 | Rockefeller et al. |
| 7,724,131 B2 | 5/2010 | Chen |
| 7,768,414 B2 | 8/2010 | Abel et al. |
| 7,772,971 B1 | 8/2010 | Hillenburg et al. |
| 7,779,141 B2 | 8/2010 | Hashimoto et al. |
| 7,853,261 B1 | 12/2010 | Lewis et al. |
| 7,855,635 B2 | 12/2010 | Cohn et al. |
| 7,920,580 B2 | 4/2011 | Bedingfield, Sr. |
| 7,920,843 B2 | 4/2011 | Martin et al. |
| 7,952,609 B2 | 5/2011 | Simerly et al. |
| 8,265,938 B1 | 9/2012 | Verna |
| 8,284,254 B2 | 10/2012 | Romanowich et al. |
| 8,373,538 B1 | 2/2013 | Hildner et al. |
| 8,391,826 B2 | 3/2013 | McKenna |
| 8,401,514 B2 | 3/2013 | Ebdon et al. |
| 8,405,499 B2 | 3/2013 | Hicks, III |
| 8,471,910 B2 | 6/2013 | Cleary et al. |
| 8,520,068 B2 | 8/2013 | Naidoo et al. |
| 8,581,991 B1 | 11/2013 | Clemente |
| 8,626,210 B2 | 1/2014 | Hicks, III |
| 8,649,758 B2 | 2/2014 | Sennett et al. |
| 8,674,823 B1 | 3/2014 | Contario et al. |
| 8,692,665 B2 | 4/2014 | Hicks, III |
| 8,780,199 B2 | 7/2014 | Mimar |
| 8,831,970 B2 | 9/2014 | Weik et al. |
| 8,847,749 B2 | 9/2014 | Hicks, III |
| 8,884,772 B1 | 11/2014 | Zhang |
| 8,902,740 B2 | 12/2014 | Hicks, III |
| 8,937,658 B2 | 1/2015 | Hicks, III |
| 8,970,365 B2 | 3/2015 | Wedig et al. |
| 9,060,116 B2 | 6/2015 | Kim |
| 9,135,806 B2 | 9/2015 | Hicks |
| 9,246,740 B2 | 1/2016 | Hicks |
| 9,318,005 B2 | 4/2016 | Hicks |
| 2002/0175995 A1 | 11/2002 | Sleeckx |
| 2002/0193107 A1 | 12/2002 | Nascimento |
| 2003/0025599 A1 | 2/2003 | Monroe |
| 2003/0062997 A1 | 4/2003 | Naidoo |
| 2003/0179712 A1 | 9/2003 | Kobayashi et al. |
| 2003/0227220 A1 | 12/2003 | Biskup et al. |
| 2004/0028391 A1 | 2/2004 | Black et al. |
| 2004/0086088 A1 | 5/2004 | Naidoo et al. |
| 2004/0086091 A1 | 5/2004 | Naidoo et al. |
| 2004/0086093 A1 | 5/2004 | Schranz |
| 2004/0113770 A1 | 6/2004 | Falk |
| 2004/0137959 A1 | 7/2004 | Salzhauer |
| 2004/0177136 A1 | 9/2004 | Chen et al. |
| 2004/0196833 A1 | 10/2004 | Dahan et al. |
| 2004/0233983 A1 | 11/2004 | Crawford et al. |
| 2005/0066033 A1 | 3/2005 | Cheston et al. |
| 2005/0068175 A1 | 3/2005 | Faulkner et al. |
| 2005/0174229 A1 | 8/2005 | Feldkamp |
| 2006/0002721 A1 | 1/2006 | Sasaki |
| 2006/0028488 A1 | 2/2006 | Gabay et al. |
| 2006/0055529 A1 | 3/2006 | Ratiu et al. |
| 2006/0064505 A1 | 3/2006 | Lee et al. |
| 2006/0067484 A1 | 3/2006 | Elliot et al. |
| 2006/0154642 A1 | 7/2006 | Scannell, Jr. |
| 2006/0170778 A1 | 8/2006 | Ely |
| 2006/0239250 A1 | 10/2006 | Elliot et al. |
| 2006/0271695 A1 | 11/2006 | Lavian |
| 2007/0049259 A1 | 3/2007 | Onishi et al. |
| 2007/0104218 A1 | 5/2007 | Hassan et al. |
| 2007/0115930 A1 | 5/2007 | Reynolds et al. |
| 2007/0124782 A1 | 5/2007 | Hiral et al. |
| 2007/0139192 A1 | 6/2007 | Wimberly et al. |
| 2007/0226344 A1 | 9/2007 | Sparrell et al. |
| 2007/0247187 A1 | 10/2007 | Webber et al. |
| 2007/0279214 A1 | 12/2007 | Buehler |
| 2007/0290830 A1 | 12/2007 | Gurley |
| 2008/0055423 A1 | 3/2008 | Ying |
| 2008/0061923 A1 | 3/2008 | Simon et al. |
| 2008/0090546 A1 | 4/2008 | Dickenson et al. |
| 2008/0167068 A1 | 7/2008 | Mosleh et al. |
| 2008/0191857 A1 | 8/2008 | Mojaver |
| 2008/0225120 A1 | 9/2008 | Stuecker |
| 2008/0261515 A1 | 10/2008 | Cohn et al. |
| 2008/0279345 A1 | 11/2008 | Zellner et al. |
| 2008/0311878 A1 | 12/2008 | Martin et al. |
| 2008/0311879 A1 | 12/2008 | Martin et al. |
| 2009/0006525 A1 | 1/2009 | Moore |
| 2009/0010493 A1 | 1/2009 | Gornick |
| 2009/0017751 A1 | 1/2009 | Blum |
| 2009/0047016 A1 | 2/2009 | Bernard et al. |
| 2009/0058630 A1 | 3/2009 | Friar et al. |
| 2009/0060530 A1 | 3/2009 | Biegert et al. |
| 2009/0109898 A1 | 4/2009 | Adams et al. |
| 2009/0191858 A1 | 7/2009 | Calisti et al. |
| 2009/0267754 A1 | 10/2009 | Nguyen et al. |
| 2009/0274104 A1 | 11/2009 | Addy |
| 2009/0276713 A1 | 11/2009 | Eddy |
| 2009/0285369 A1 | 11/2009 | Kandala |
| 2009/0315699 A1 | 12/2009 | Satish et al. |
| 2009/0323904 A1 | 12/2009 | Shapiro et al. |
| 2010/0073856 A1 | 3/2010 | Huang et al. |
| 2010/0145161 A1 | 6/2010 | Niyato et al. |
| 2010/0279664 A1 | 11/2010 | Chalk |
| 2010/0281312 A1 | 11/2010 | Cohn et al. |
| 2010/0302025 A1 | 12/2010 | Script |
| 2010/0302938 A1 | 12/2010 | So |
| 2011/0003577 A1 | 1/2011 | Rogalski et al. |
| 2011/0032109 A1 | 2/2011 | Fox |
| 2011/0044210 A1 | 2/2011 | Yokota |
| 2011/0058034 A1 | 3/2011 | Grass |
| 2011/0090334 A1 | 4/2011 | Hicks, III |
| 2011/0113142 A1 | 5/2011 | Rangegowda et al. |
| 2011/0183643 A1 | 7/2011 | Martin et al. |
| 2011/0197246 A1 | 8/2011 | Stancato et al. |

(56) References Cited

U.S. PATENT DOCUMENTS

| | | |
|---|---|---|
| 2011/0211440 A1 | 9/2011 | Arsenault et al. |
| 2011/0244854 A1 | 10/2011 | Hansson et al. |
| 2011/0254681 A1 | 10/2011 | Perkinson |
| 2011/0317622 A1 | 12/2011 | Arsenault |
| 2012/0084857 A1 | 4/2012 | Hubner |
| 2012/0099253 A1 | 4/2012 | Tang |
| 2012/0099256 A1* | 4/2012 | Fawcett .................. A47F 7/024 361/679.01 |
| 2012/0163380 A1 | 6/2012 | Kolbe et al. |
| 2012/0190386 A1 | 7/2012 | Anderson |
| 2012/0278453 A1 | 11/2012 | Baum |
| 2012/0314597 A1 | 12/2012 | Singh et al. |
| 2013/0027561 A1 | 1/2013 | Lee |
| 2013/0099919 A1 | 4/2013 | Cai et al. |
| 2013/0103309 A1 | 4/2013 | Cai et al. |
| 2013/0120132 A1 | 5/2013 | Hicks, III |
| 2013/0120138 A1 | 5/2013 | Hicks, III |
| 2013/0121239 A1 | 5/2013 | Hicks, III |
| 2013/0135993 A1 | 5/2013 | Morrill et al. |
| 2013/0155245 A1 | 6/2013 | Slamka |
| 2013/0170489 A1 | 7/2013 | Hicks, III |
| 2013/0214925 A1 | 8/2013 | Weiss |
| 2013/0235209 A1 | 9/2013 | Lee et al. |
| 2013/0273875 A1 | 10/2013 | Martin et al. |
| 2014/0095164 A1 | 4/2014 | Sone et al. |
| 2014/0167969 A1 | 6/2014 | Wedig |
| 2014/0253326 A1 | 9/2014 | Cho et al. |
| 2015/0054645 A1 | 2/2015 | Hicks, III |
| 2015/0056946 A1 | 2/2015 | Leggett et al. |
| 2015/0085130 A1 | 3/2015 | Hicks, III |
| 2015/0097683 A1 | 4/2015 | Sloo et al. |
| 2015/0137967 A1 | 5/2015 | Wedig et al. |
| 2015/0364029 A1 | 12/2015 | Hicks, III |
| 2016/0284205 A1 | 6/2016 | Hicks, III |
| 2016/0196734 A1 | 7/2016 | Hicks, III |
| 2016/0225239 A1 | 8/2016 | Hicks, III |
| 2017/0076562 A1 | 3/2017 | Hicks, III |
| 2017/0132890 A1 | 5/2017 | Hicks, III |
| 2017/0140620 A1 | 5/2017 | Hicks, III |

* cited by examiner

FIG. 24
Options for Connecting Alarm Controller to Customer's Broadband Data Service:
1) Cat5e/Cat6 Ethernet cable between customer's gateway/modem/router and the Alarm Controller
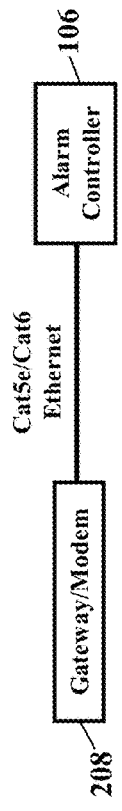
2) HomePlug AV to Ethernet adapter installed at customer's gateway/modem/router
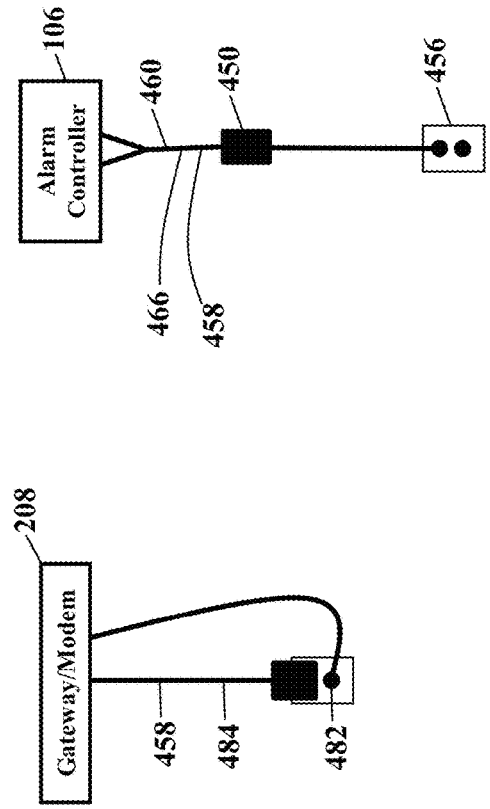

FIG. 29

Alarm Controller

- Installable in AT&T Digital Life Cabinet
- AT&T Application Execution Environment:
  - JVM/OSGi Services Framework
  - SDK for 3rd Party Application Development
- Gigabit Ethernet Switch and Ports
- Gigabit WAN Ethernet Interface*
- USB Ports
- 24 Hour Battery Backup
- HomePlug AV Based on CopperGate Technology with Diversity
- VoIP Functionality
- Two-Way Interactive Voice Communication with Central Monitoring Station Agent during an Alarm Condition
- IMS VoIP ATA Function (Future)
- TR-069 Remote Management
- Modules:
  - Standard
    - 3G Cellular Data (GPRS, EDGE, UMTS and HSPA + SMS) with Integrated Antenna
    - 433/900MHz Proprietary Transceiver
    - 24 Hour Battery Backup
    - DECT Base Station
  - Optional
    - Takeover Module (Interfaces for Wired Keypads, Wired Sirens and Wired Window/Door Contacts)
    - Hard Drive (Optional – Outside of Cabinet)
    - External 3G Antenna Cabinet and Alarm Controller may be deployed everywhere, including with ADSL, VDSL, GPON or Bring-Your-Own-Broadband, to support a wide range set of Digital Life Services Note: Assume that customer's existing 802.11 b/g access point will be used to support Wi-Fi Touch Pad and other Wi-Fi devices

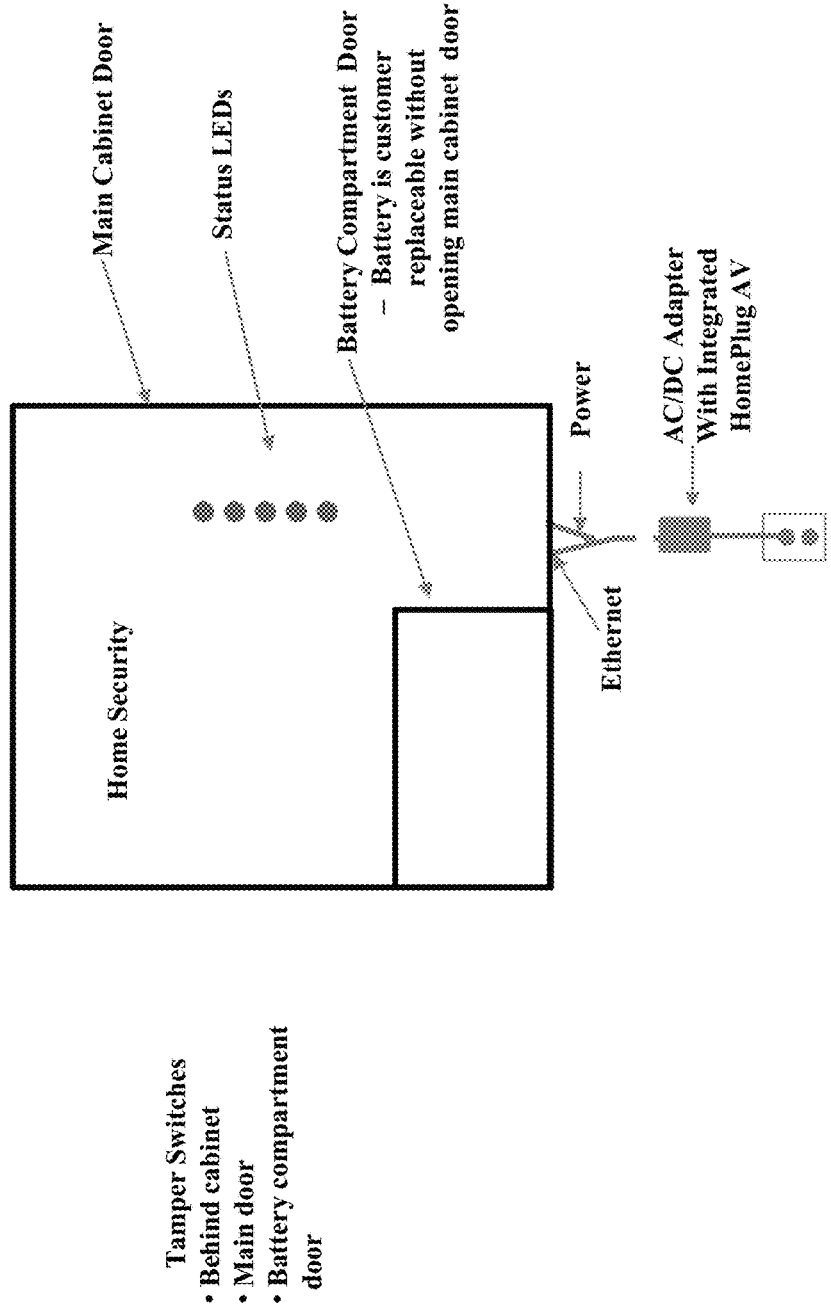

Security Cabinet - *Main Cabinet Door Open*

FIG. 32

Security Cabinet Door LEDs

| LED Label | Led Function | Normal State | Other State(s) | Comments |
|---|---|---|---|---|
| Power | AC Power | Green (HW) | Flash/Off | Flash while powering up, Off AC power outage |
| | Battery | Green (SW) | Red/Off | Green is good, Red is replace battery, Off is dead or no battery |
| System | System | Green (SW) | Yellow/Red/Off | Green is good, Red is problem, Yellow is test mode |
| Signal | Signal | Green (SW) | Yellow/Red/Off | Green is good, Red no/or low 3G/4G signal, Yellow is problem with another radio subsystem |
| Broadband | Wireline WAN | Green (SW) | Off | Green is connection, Off is no connection |

Note: SW = Software Control, HW = Hardware Control

FIG. 33

| Device | Technology |
|---|---|
| Wireless Door/Window Contact | 433 MHz Proprietary (One-Way) |
| Wireless Motion Sensor (PIR) | 433MHz Proprietary (One-Way) |
| Wireless Smoke Detector | 433MHz Proprietary (One-Way) |
| Wireless CO Detector | 433MHz Proprietary (One-Way) |
| Wireless Glass Breakage Detector | 433MHz Proprietary (One-Way) |
| Wireless Temperature/Flood Detector | 433MHz Proprietary (One-Way) |
| Wireless Key Fob | 433MHz Proprietary (One-Way) |
| Wireless 433MHz One-Way Repeater | 433 MHz Proprietary (One-Way) |
| Wired/Wireless Keypad | Wired/900MHz Proprietary (Two-Way) |
| Wireless Device Controller | 900MHz Proprietary (Two-Way) |
| Wired/Wireless Voice Annunciator - Siren | Wired/900 MHz Proprietary (Two-Way) |
| Wireless 900MHz Two-Way Repeater | 900MHz Proprietary (Two-Way) |
| Fixed IP Indoor Ethernet Camera with HomePlug AV | HomePlug AV |
| Pan/Tilt IP Indoor Ethernet Camera with HomePlug AV | HomePlug AV |
| Fixed Outdoor IP Ethernet Camera with HomePlug AV | HomePlug AV |
| HomePlug AV to Ethernet Adapter | HomePlug AV |
| DECT Intercom Speakerphone Unit | DECT 6.0 |
| Hard Drive (Optional) | eSATA Interface |
| 3G Cellular Data Module External Antenna (Optional) | 3G Cellular Data |

FIG. 35

24 Hour Battery Backup (Standard)

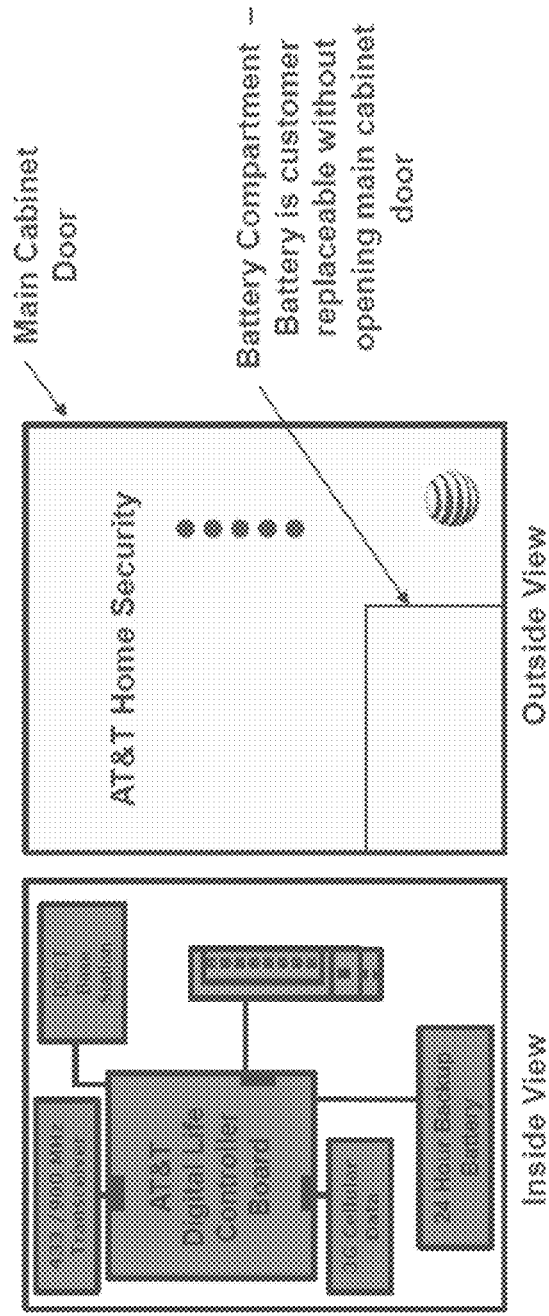

- Main Cabinet Door
- Battery Compartment – Battery is customer replaceable without opening main cabinet door
- Inside View
- Outside View
- AT&T Home Security

- During local power failure, 24 Hour Battery Backup powers the AT&T Digital Life Controller Board, 433/900 MHz Transceiver Module and 3G Cellular Data Module, DECT Base Station Module and if present it powers the Takeover Module
- AT&T Digital Life Controller Board monitors the health of the battery and automatically reports a low battery condition to the Central Monitoring Station
- The AT&T Home Security Cabinet is equipped with a battery compartment that enables customer or technician to access and replace the battery without opening the main cabinet door
- During local power failure conditions the battery will power the AT&T Digital Life Controller Board and some sub-systems automatically may be shutdown to preserve battery life

FIG. 36

Hard Drive Module (Optional) – Local Archiving of Streaming Video From IP Cameras

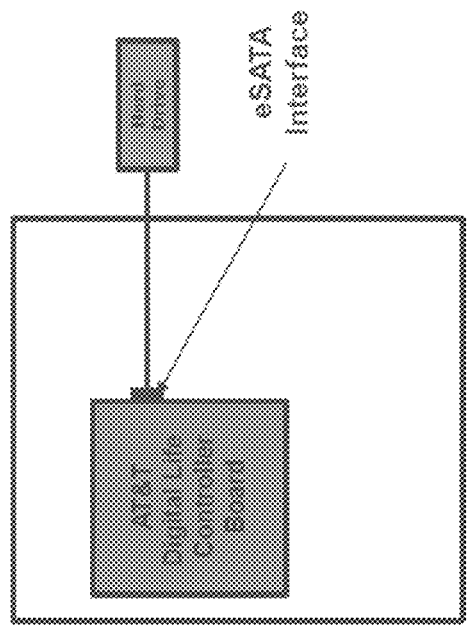

eSATA interface

- Optional Hard Drive Module is used to archive streaming video from IP cameras in the home
- Hard Drive Module is connected to AT&T Services Gateway via a eSATA interface
- Hard Drive Module is powered down under local power failure conditions
- Customer is able to access and view stored video using a browser equipped device, such as a PC, Wi-Fi touch tablet or mobile device
- A search function is provided so that a user can easily locate stored video based on date, time of day and IP camera
- The storage includes an index of alarm reporting to the Central Monitoring Station, so that a user can easily locate pre- and post- alarm video associated with an alarm report to the Central Monitoring Station

FIG. 40

Communication Between Digital Life Controller Network Platform

| Operating Mode | AT&T 3G/4G Cellular Data Service | Customer's Wireline Broadband Data Service | AT&T SMS Service |
|---|---|---|---|
| (Normal Operation) 3G/4G Cellular Data Service is Operating and Wireline Broadband Data Service is Operating | Life/Safety IP Alarm Reporting to AT&T Network Platform | Remaining IP Traffic to AT&T Network Platform | |
| 3G/4G Cellular Data Service is Not Operating and Wireline Broadband Data Service is Operating | | Life/Safety IP Alarm Reporting to AT&T Network Platform and Remaining IP Traffic to AT&T Network Platform | |
| 3G/4G Cellular Data Service is Operating and Wireline Broadband Data Service is Not Operating | Life/Safety IP Alarm Reporting to AT&T Network Platform and Remaining IP Traffic to AT&T Network Platform | | |
| 3G/4G Cellular Data Service is Not Operating and Wireline Broadband Data Service is Not Operating | | | Life/Safety IP Alarm Reporting to AT&T Network Platform |

US 10,453,316 B2

METHODS, SYSTEMS, AND PRODUCTS FOR SECURITY SERVICES

CROSS-REFERENCE TO RELATED APPLICATIONS

This application is a continuation of U.S. application Ser. No. 15/081,982 filed Mar. 28, 2016 and since issued as U.S. Pat. No. 9,953,500, which is a continuation of U.S. application Ser. No. 13/293,213 filed Nov. 10, 2011 and since issued as U.S. Pat. No. 9,396,634, with both applications incorporated herein by reference in their entireties.

BACKGROUND

Exemplary embodiments generally relate to communications and, more particularly, to alarm systems and to sensing conditions.

Security systems are common in homes and businesses. Security systems alert occupants to intrusions. Security systems, though, may also warn of fire, water, and harmful gases.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 22-24 are schematics illustrating a powerline-to-Ethernet adapter, according to exemplary embodiments;

FIGS. 29-36 are schematics further illustrating an alarm controller, according to exemplary embodiments;

FIGS. 37-42 are schematics further illustrating verification of alarms, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
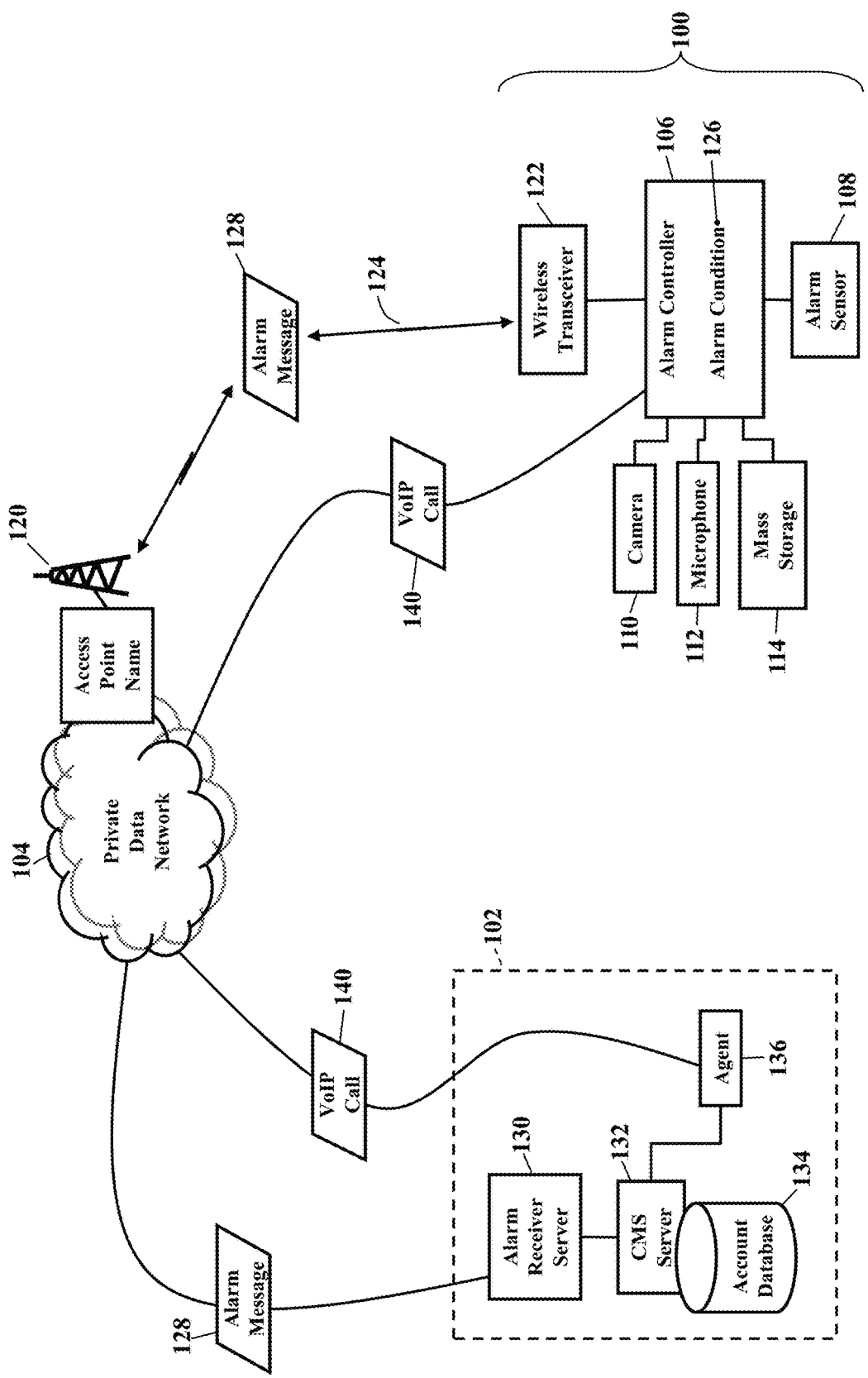
FIG. 1 is a simplified schematic illustrating an environment in which exemplary embodiments may be implemented.

FIG. 1 is a simplified schematic illustrating an environment in which exemplary embodiments may be implemented. A security system 100 communicates with a central monitoring station 102 using a private data network 104. The security system 100 has an alarm controller 106 that receives information from one or more alarm sensors 108. As those of ordinary skill in the art understand, the alarm sensors 108 monitor for heat, smoke, motion, gases, sound, or any other physical or logical parameter that may indicate a security event. The alarm controller 106 may also interface with one or more cameras 110 that capture video data and microphones 112 that capture audio data. The cameras 110 and microphones 112 may constantly capture video and audio that is automatically stored in a local mass storage device 114.

The security system 100 may wirelessly communicate with the private data network 104. The private data network 104, for example, may have an access point name (or "APN") 120 that identifies a wireless Internet protocol packet data network that will be used to establish a wireless cellular network connection 124 between the alarm controller 106 and the private data network 104. The security system 100 has a wireless transceiver 122 that uses the access point name 120 to communicate with the private data network 104. The security system 100, for example, may send and receive packets of data using a wireless carrier's 3G/LTE/4G cellular network. The security system 100 may connect using a general packet radio service (GPRS), enhanced data rates for global evolution (EDGE), a universal mobile telecommunications service (UMTS), and/or a high speed packet access (HSPA). The wireless transceiver 122, however, may additionally or alternatively utilize any portion of the electromagnetic spectrum and/or any communications standard or specification (such as WI-FI®, BLUETOOTH®, or WI-MAX®). The access point name 120 is a protocol that describes a configurable network identifier when connecting to the private data network 104. The access point name 120 determines what type of network connection should be created, what Internet protocol address (es) should be assigned to the security system 100 (e.g., the wireless transceiver 122), and what security methods should be used. The access point name 120 may identify the Internet protocol packet data network and the type of service that is provided by the wireless Internet protocol packet data network.

The security system 100 provides security services. The security system 100 monitors the inputs, status, or state of the alarm sensors 108, the cameras 110, and/or the microphones 112. When the security system 100 detects an alarm condition 126, the security system 100 generates an alarm message 128. The alarm message 128 is wirelessly sent to the access point name 120 and routed through the private data network 104 to the central monitoring station 102. The alarm message 128, for example, may be received at a centralized alarm receiver server 130 and routed to a central monitoring station ("CMS") server 132. The central monitoring station server 132 may query an account database 134 to discover detailed customer information (as later paragraphs will explain). The central monitoring station server 132 may then assign a human or computerized agent 136.

The agent 136 may first verify the alarm condition 126. As the reader may understand, a high percentage of alarms are "false." That is, alarms are often inadvertently triggered, such as when an owner of a home opens a door and accidentally triggers the alarm. If the central monitoring station server 132 were to immediately summon emergency services, and the alarm is false, then local police and fire departments have wasted time and resources. Some municipalities may even impose fees for an unnecessary dispatch. One of the primary functions of the agent 136, then, is to first ascertain a true emergency before summoning emergency services.

The security system 100 may thus have two-way interactive voice capabilities. The agent 136, for example, may establish a Voice-over Internet protocol ("VoIP") call 140 with the security system 100. The agent 136, for example, may call a number assigned to the security system 100 and directly speak with an occupant of a home or business (as later paragraphs will explain). The Voice-over Internet protocol call 140 may also use the access point name 120 associated with the private, wireless cellular network connection 124 with the wireless transceiver 122. The Voice-over Internet protocol call 140 may alternatively route over a wireline broadband connection to the alarm controller 106. The agent 136 may additionally or alternatively call a designated number (such as a mobile phone) when alarms are detected. The agent 136 may also retrieve audio and/or video data from the camera 110 and/or the microphone 112 (again, as later paragraphs will explain). The audio and/or video data may be live, real-time data captured by the cameras 110 and/or the microphones 112, but archived audio/video data may also be retrieved. The agent may thus speak with an occupant, and view the audio and/or video data, to determine if the alarm condition 126 represents a true emergency. If the alarm is a legitimate security concern, then the agent 136 may notify local emergency services.

Figure 2:
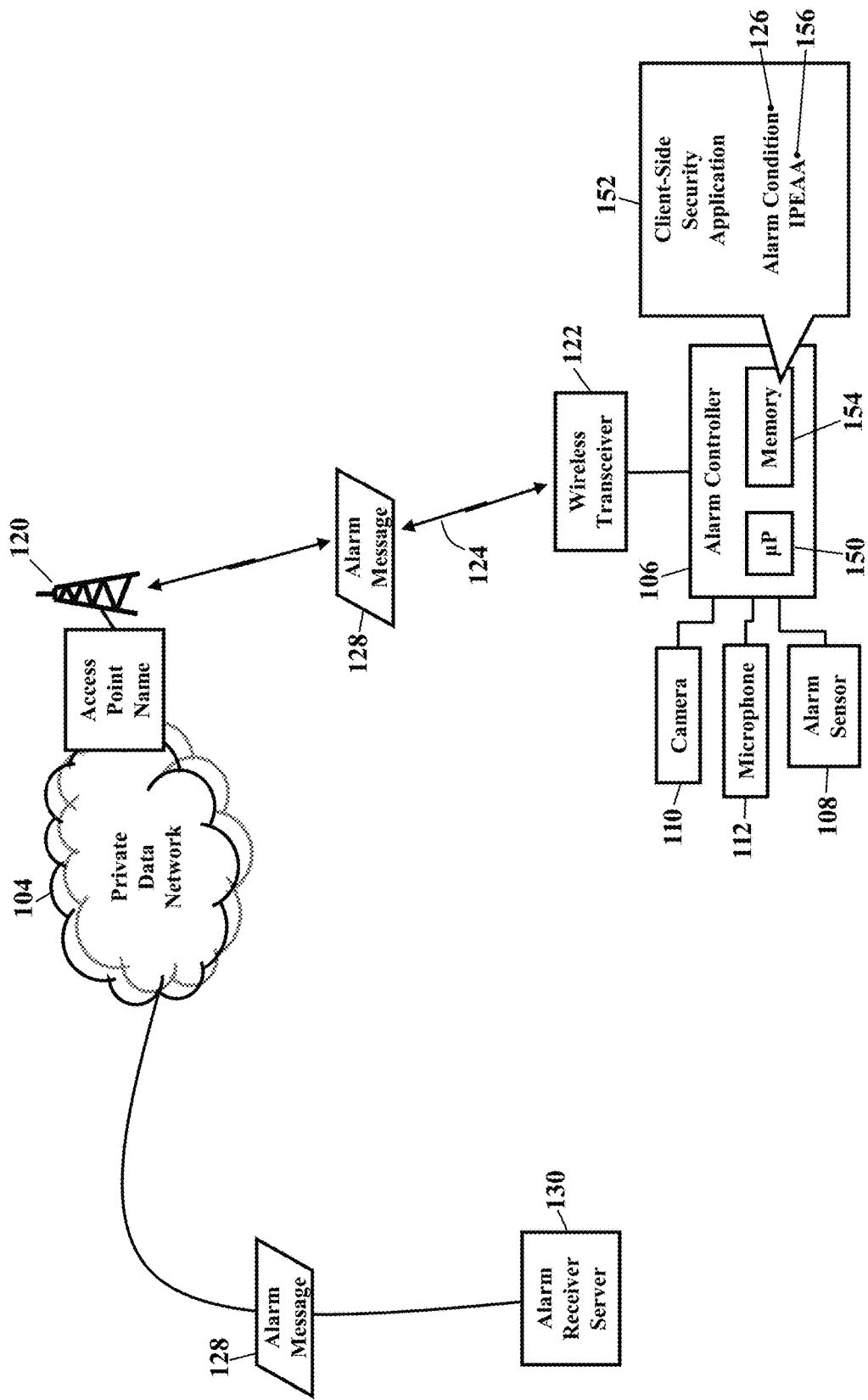
FIG. 2 is a detailed schematic illustrating a security system, according to exemplary embodiments.

FIG. 2 is a more detailed schematic illustrating the security system 100, according to exemplary embodiments. The alarm controller 106 has a processor 150 (e.g., "μP"), application specific integrated circuit (ASIC), or other component that executes a client-side security application 152 stored in a memory 154. The client-side security application 152 monitors the inputs, status, or state of the alarm sensors 108, the cameras 110, and/or the microphones 112. The client-side security application 152 may instruct any of the cameras 110 and/or the microphones 112 to capture audio and/or video data. When the client-side security application 152 detects the alarm condition 126, the client-side security application 152 instructs the processor 150 to retrieve an IP emergency alarm address ("IPEAA") 156 from the memory 124. The IP emergency alarm address 156 is a network communications address at which the centralized alarm receiver server 130 receives packetized alarm messages from customers/subscribers of an alarm monitoring service. The IP emergency alarm address 156 may be preloaded into the memory 124, and the IP emergency alarm address 156 may be changed after a software update to the client-side security application 152.

The client-side security application 152 generates the alarm message 128. The alarm message 128 includes data that identifies a network address associated with the alarm controller 106. The alarm message 128 may also include data that describes the alarm condition 126, such as an alarm code associated with the sensor 108. The alarm message 128 may also include information describing the customer, such as a customer account code, physical street address, or other customer identifier. Whatever data is included in the alarm message 128, the data is packetized according to a packet protocol. The alarm message 128 may also be encrypted to ensure privacy. Once the alarm message 128 is formatted and ready, the processor 150 commands the wireless transceiver 122 to wirelessly send the alarm message 128.

The alarm message 128 routes through the private data network 104. The alarm message 128 is sent to the access point name 120 associated with the private, wireless cellular network connection 124 to the private data network 104. Packet headers are added or modified to route the alarm message 128 through the private data network 104 to the IP emergency alarm address 156 associated with the centralized alarm receiver server 130. Because the private data network 104 is controlled and/or operated by a single carrier, the alarm message 128 is secure and never encounters a publicly-available network segment.

The alarm message 128 may be encrypted and/or packetized using any packet protocol. As those of ordinary skill in the art understand, the alarm message 128 may be packetized (or "framed") for routing through the private data network 104. Information is grouped into packets according to a packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. The private data network 104 may even utilize "mixed" protocols, where a translator determines the particular packet protocol and the appropriate destination for each packet. Because the basics of packetizing and packet protocols are well-known, this disclosure will not further explain the packetizing of the alarm message 128.

Figure 3:
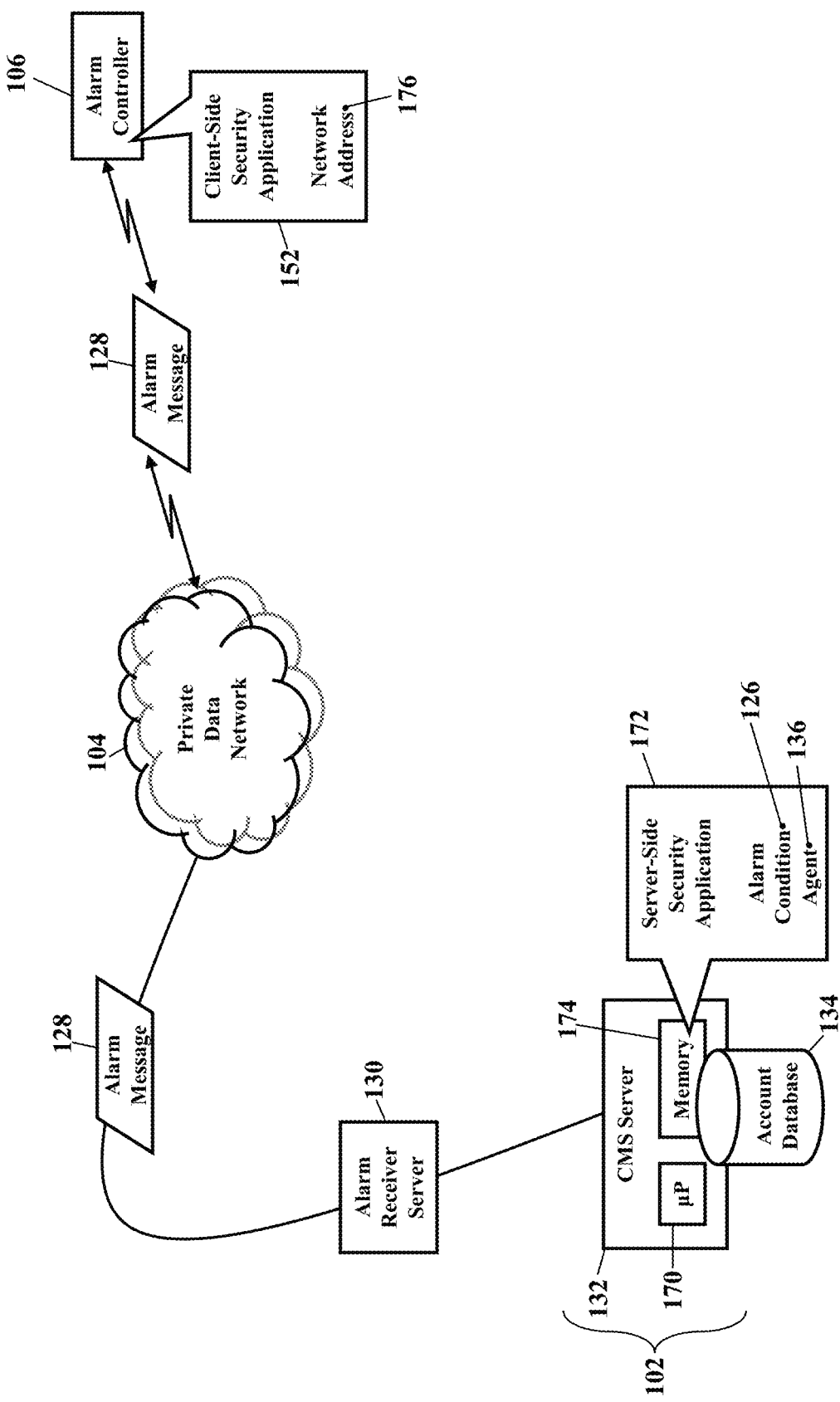
FIG. 3 is a detailed schematic illustrating receipt of an alarm message, according to exemplary embodiments.

FIG. 3 is a more detailed schematic illustrating receipt of the alarm message 128, according to exemplary embodiments. As the above paragraphs explained, the alarm message 128 wirelessly routes from the alarm controller 106, through the private data network 104, and to the centralized alarm receiver server 130. The centralized alarm receiver server 130 may then route the alarm message 128 to the central monitoring station ("CMS") server 132. The central monitoring station server 132 has a processor 170 (e.g., "µP"), application specific integrated circuit (ASIC), or other component that executes a server-side security application 172 stored in a memory 174. The server-side security application 172 and the client-side security application 152 cooperate in a client-server environment to notify of alarms from the security system 100.

When the central monitoring station server 132 receives the alarm message 128, the server-side security application 172 obtains any data associated with the alarm message 128. The server-side security application 172, for example, may obtain the customer account code contained in the alarm message 128 to retrieve customer account information from the account database 134. The server-side security application 172 may then pass the alarm condition 126 and any account information on to the agent 136. The server-side security application 172 may also retrieve a static, dynamic, and/or private network address 176 associated with the alarm controller 106. The network address 176 uniquely identifies the alarm controller 106 that generated the alarm message 128. The network address 176 may be retrieved from the account database 134, or the network address 176 may be extracted from one or more header portions and/or payload portions of the packetized alarm message 128. However the network address 176 is obtained, the server-side security application 172 knows the identity of the alarm controller 106 detecting the alarm condition 126. The server-side security application 172 may then assign the human or computerized agent 136.

Figure 4:
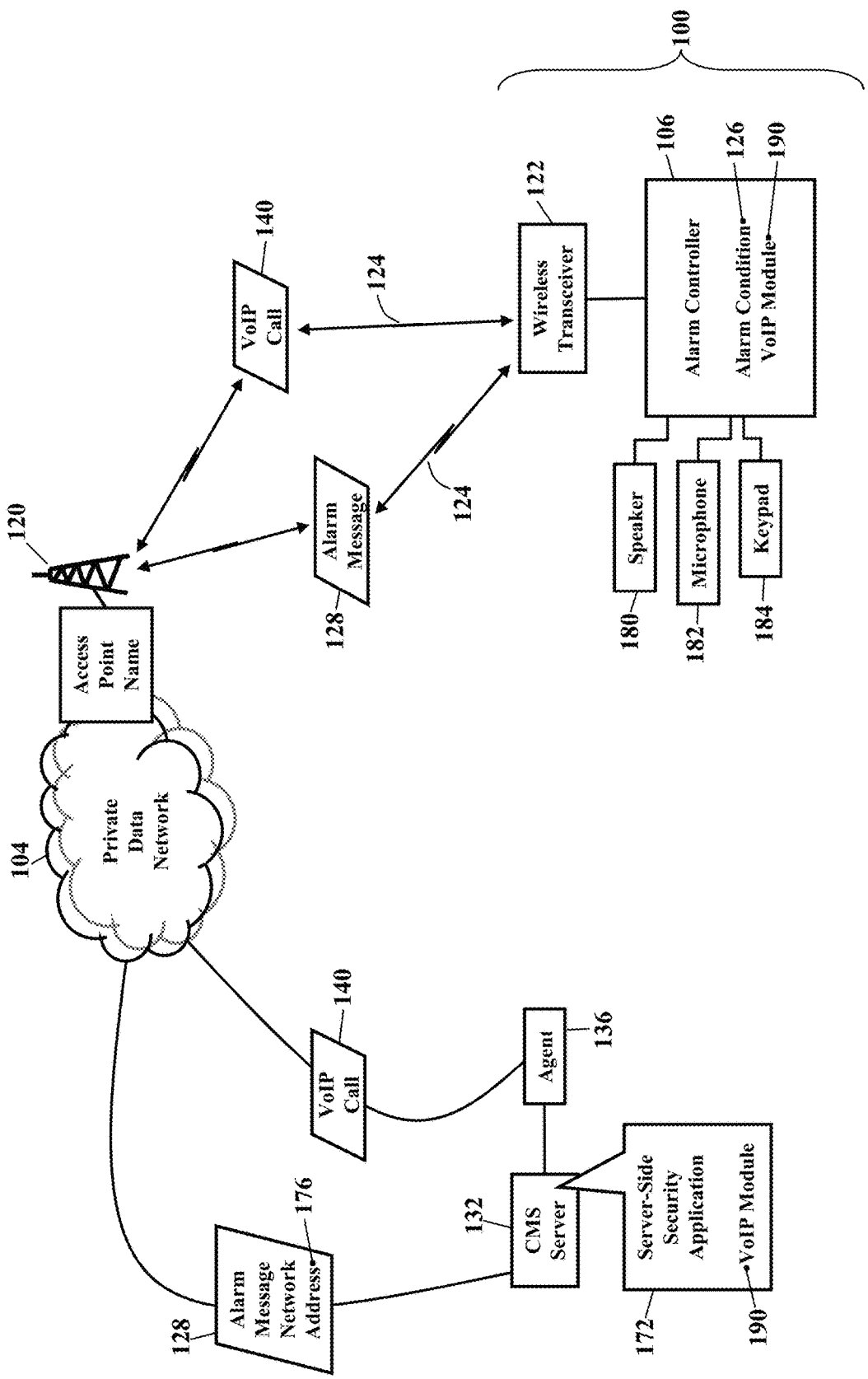
FIG. 4 is a detailed schematic illustrating a verification call, according to exemplary embodiments.

FIG. 4 is a detailed schematic illustrating a verification call, according to exemplary embodiments. Here the agent 136 directly calls the alarm controller 106 to verify the alarm. Because the unique network address 176 of the alarm controller 106 has been obtained from the alarm message 128, the agent 136 may establish communication directly with the alarm controller 106. The agent 136, for example, may establish the Voice-over Internet Protocol call 140 to the alarm controller 106. The alarm controller 106 has a Man-Machine Interface, such as a speaker 180, a microphone 182, and/or a keypad 184. The server-side security application 172 may also have a VoIP module 190 for conducting two-way voice communication. The agent 136 may thus call the alarm controller 106 to verify the alarm condition 126. The agent's speech may be output from the speaker 180, and the occupant may speak into the microphone 182. The Voice-over Internet Protocol call 140 is thus enabled between the agent 136 and the occupant at the alarm controller 106. The agent 136 may require that the occupant authenticate himself/herself, such as by entering a code or password on the keypad 184. The occupant, however, may alternately speak a phrase to verify identity and/or the alarm condition 126. If the occupant verifies the alarm condition 126, then the agent 136 may summon emergency services.

Figure 5:
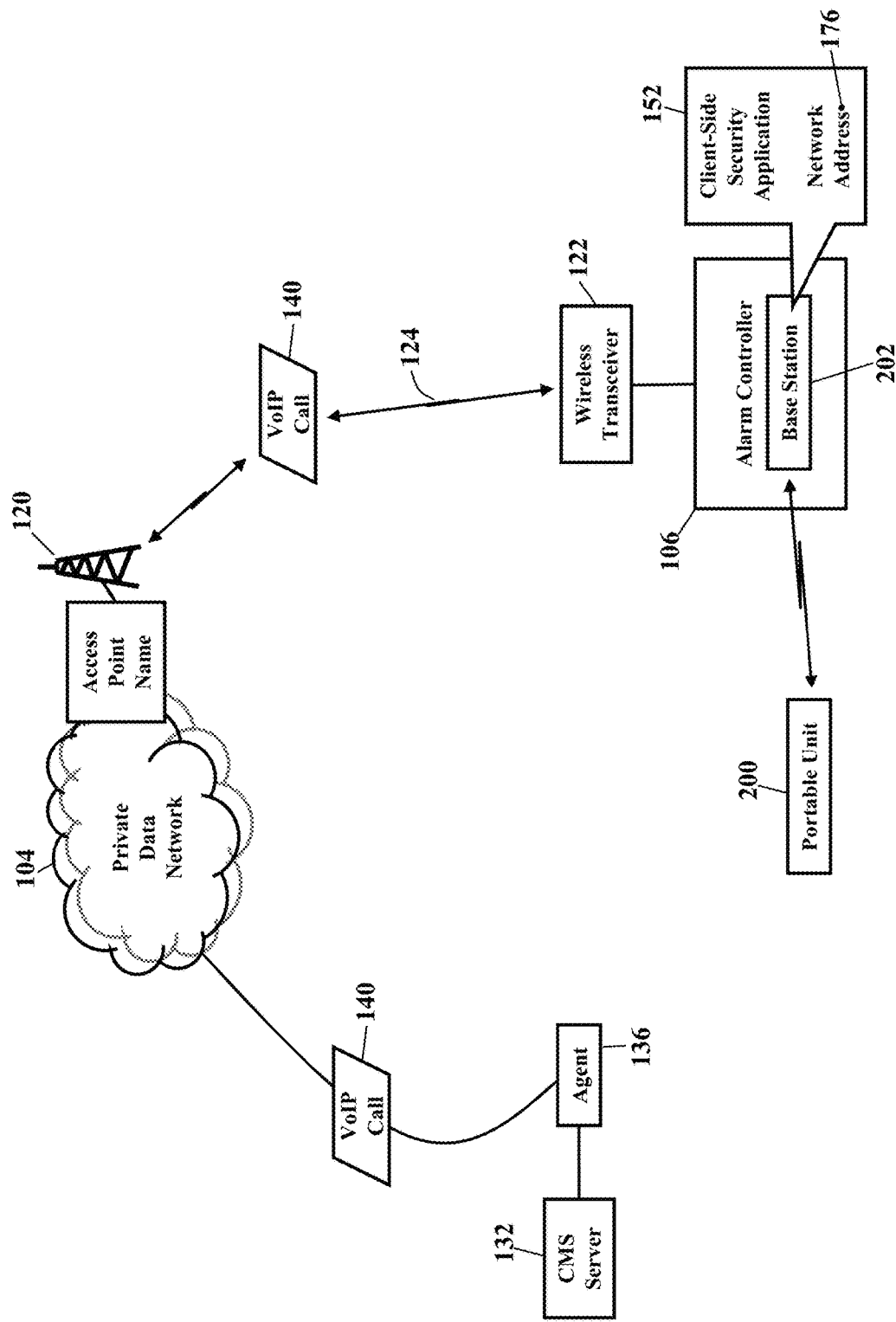
FIGS. 5-6 are schematics illustrating cordless voice and telephony capabilities, according to exemplary embodiments.
Figure 6:
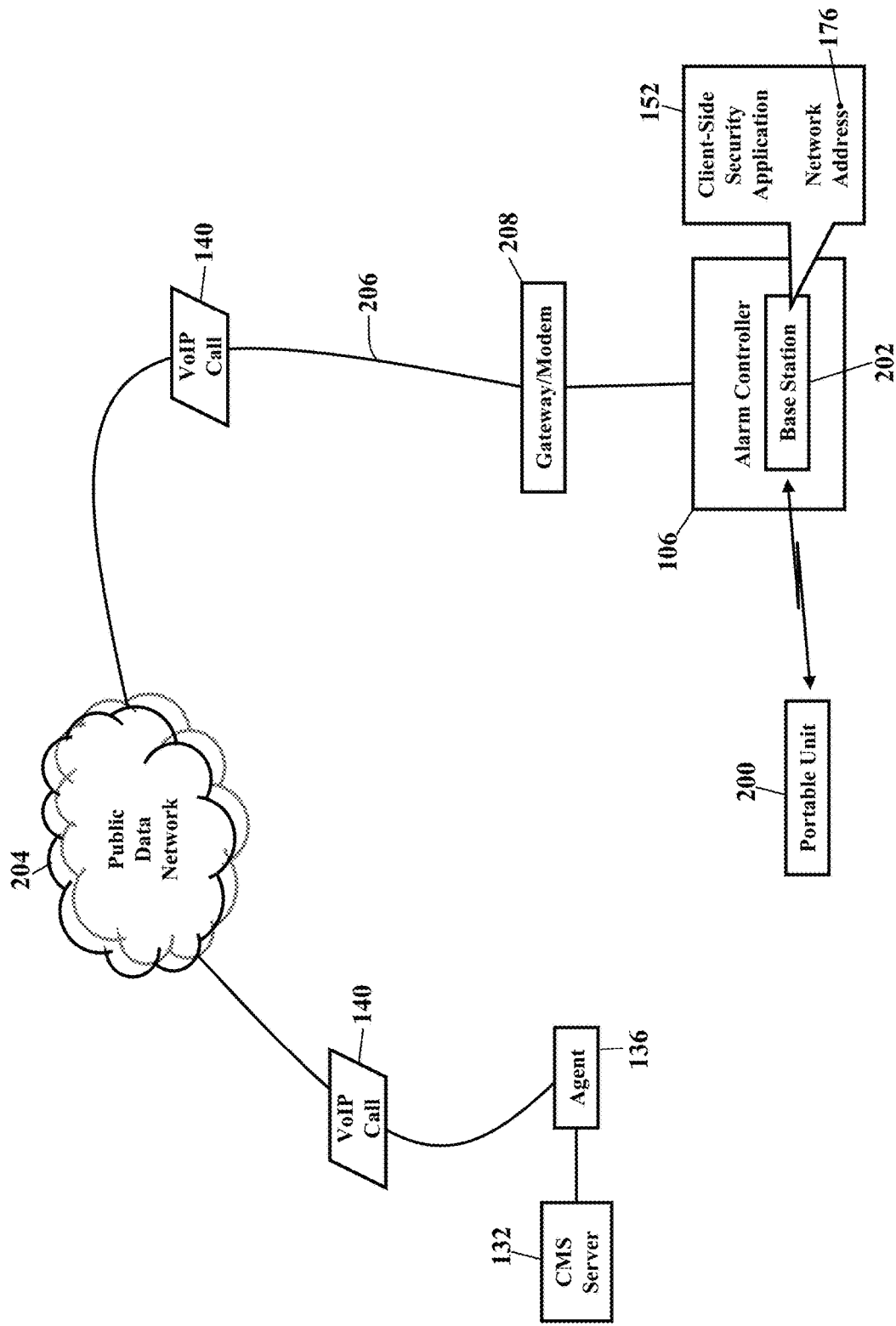

FIGS. 5-6 are schematics illustrating cordless voice and telephony capabilities, according to exemplary embodiments. Here, when the agent 136 calls the alarm controller 106 to verify the alarm condition 126, the call may be broadcast to one or more portable units 200 (such as cordless telephony handsets). The alarm controller 106 may thus have cordless voice and telephone capability to remotely communicate with the portable unit 200. As FIG. 5 illustrates, the alarm controller 106 may interface with a base station 202 that wirelessly communicates with each portable unit 200. Each portable unit 200, for example, may be a telephony speakerphone handset that is installed throughout the home or business. The client-side security application 152 may further have code, programming, or instructions that cause the alarm controller 106 to establish wireless telephony communication with the portable unit 200. The base station 202 and the portable unit 200, for example, may communicate according to the Digital Enhanced Cordless Telecommunications (or "DECT") standard for cordless telephony and voice monitors. When the agent 126 calls the alarm controller 106, the VoIP module 190 may cause the alarm controller 106 to enter an off-hook mode of operation and automatically answer the Voice-over Internet Protocol call 140. The base station 202 may thus broadcast the Voice-over Internet Protocol call 140 to the one or more portable units 200 (i.e., speakerphone handsets) to provide two-way interactive voice communication. An occupant and the agent 126 may conduct a two-way voice conversation to access the emergency. Because the base station 202 may automatically answer the Voice-over Internet Protocol call 140, any occupants need not find the portable unit 200 and physically answer the call. The occupant need only speak to verify the emergency. The automatic answering feature also enables the agent to listen to what is occurring in the residence. If an occupant fails to speak and verify, the agent 126 may simply listen to ambient sounds for verification.

FIG. 6 illustrates an alternate routing of the Voice-over Internet Protocol call 140. Here the Voice-over Internet Protocol call 140 may route over a public data network 204 (such as the publically-available Internet). When the agent 136 calls the unique network address 176 of the alarm controller 106, the Voice-over Internet Protocol call 140 may route over a wireline broadband connection 206 between the public data network 204 and a gateway/modem device 208. Here, then, the Voice-over Internet Protocol call 140 may not wirelessly communicate over a carrier's 3G/LTE/4G network (as FIGS. 1-5 illustrated). Still, though, the VoIP module 190 may automatically answer the Voice-over Internet Protocol call 140 and broadcast the call to the portable units 200.

Figure 7:
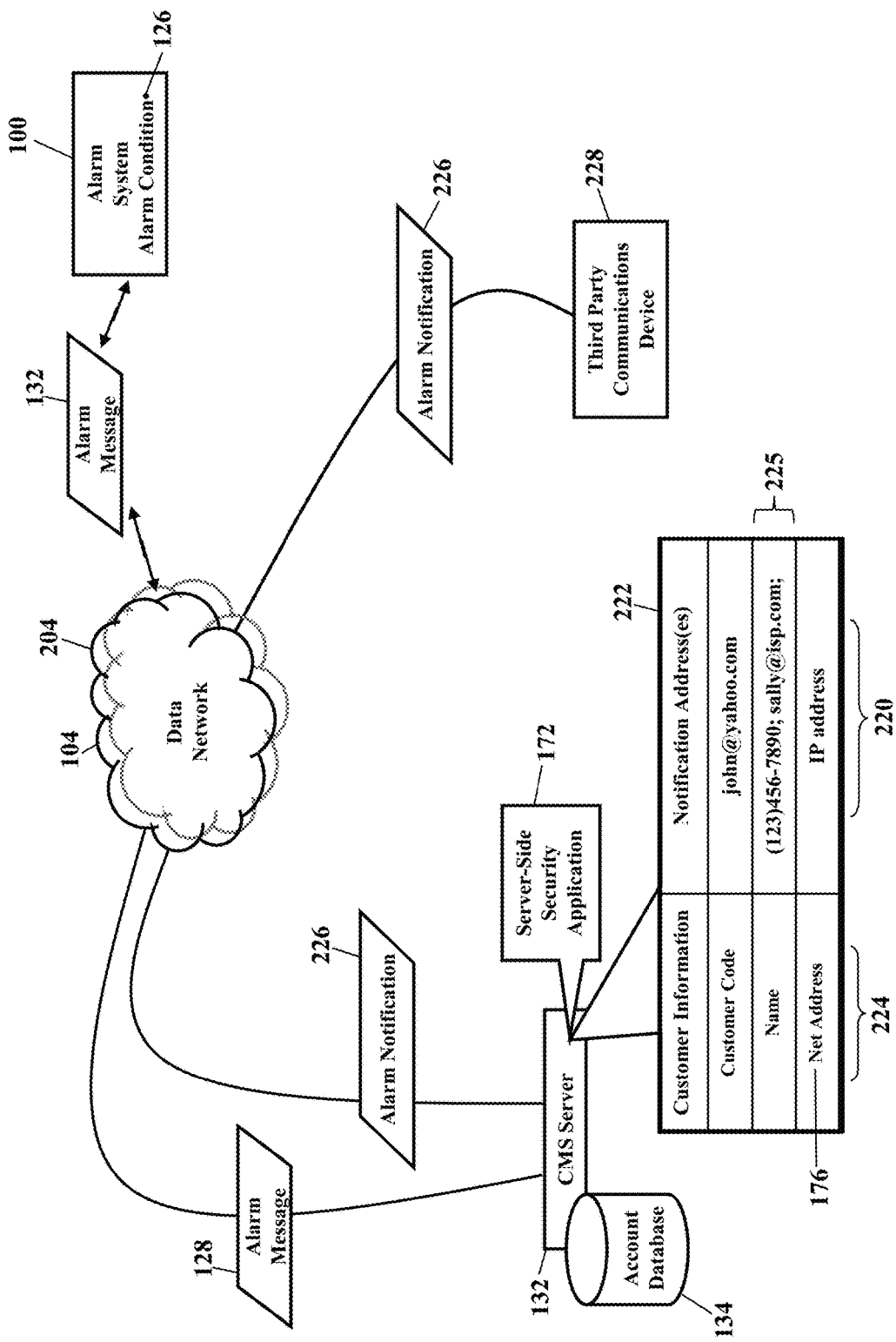
FIGS. 7-8 are schematics illustrating remote verification, according to exemplary embodiments.

FIG. 7 is a schematic illustrating remote verification, according to exemplary embodiments. If the Voice-over Internet Protocol call 140 to the alarm controller 106 is unsuccessful, remote verification may be authorized. Here the server-side security application 172 may attempt to notify one or more other addresses when the alarm condition 126 is detected. As FIG. 7 illustrates, the server-side security application 172 may query for one or more notification addresses 220. Each notification address 220 is any communications address which is notified of alarms detected by the alarm controller 106. The server-side security application 172 may query a notification table 222 for the notification address(es) 220. FIG. 7 illustrates the notification table 222 stored in the central monitoring station ("CMS") server 132, but the notification table 222 may be remotely located and accessed from any location or device in the data network 104 and/or in the public data network 204. The notification table 222 associates some customer information 224 to the notification addresses 220. The customer information 224 may be any information that uniquely identifies the customer, such as a customer code, physical address, name, or even the network address 176 assigned to the alarm controller 106. Once the customer information 224 is obtained from the account database 134, the server-side security application 172 queries the notification table 222 for the customer information 224. The notification table 222 returns the notification address(es) 220 approved for remote notification. Each notification address 220 may be a telephone number, email address, other Internet Protocol address, or any other communications address to which notifications are sent. Indeed, multiple notification addresses 220 may be associated to the customer information 224. Exemplary embodiments may thus retrieve a list 225 of notification addresses. Each entry in the list 225 of notification addresses may be a telephone number, Internet Protocol address, email address, and/or any other communications address.

An alarm notification 226 is then sent. The server-side security application 172 causes the central monitoring station server 132 to format the alarm notification 226 and to send the alarm notification 226 to each entry in the list 225 of notification addresses. The alarm notification 226 may be an electronic message, such as a text message or email message. The alarm notification 226, however, may also be an analog telephone call or a Voice-over Internet Protocol call. Regardless, the alarm notification 226 may include information describing the alarm condition 126 (such as the alarm sensor 108, a physical street address of the alarm controller 106, and/or any other information). The alarm notification 226 routes through the data network 104 and/or the public data network 204 to a third party communications device 228 associated with one of the notification addresses 220. If the alarm notification 226 involves analog telephony, the alarm notification 226 may also route along some portion of a public-switched telephony network. The server-side security application 172 may thus notify friends, neighbors, a spouse, children, and any communications addresses in the list 224 of notification addresses.

Figure 8:
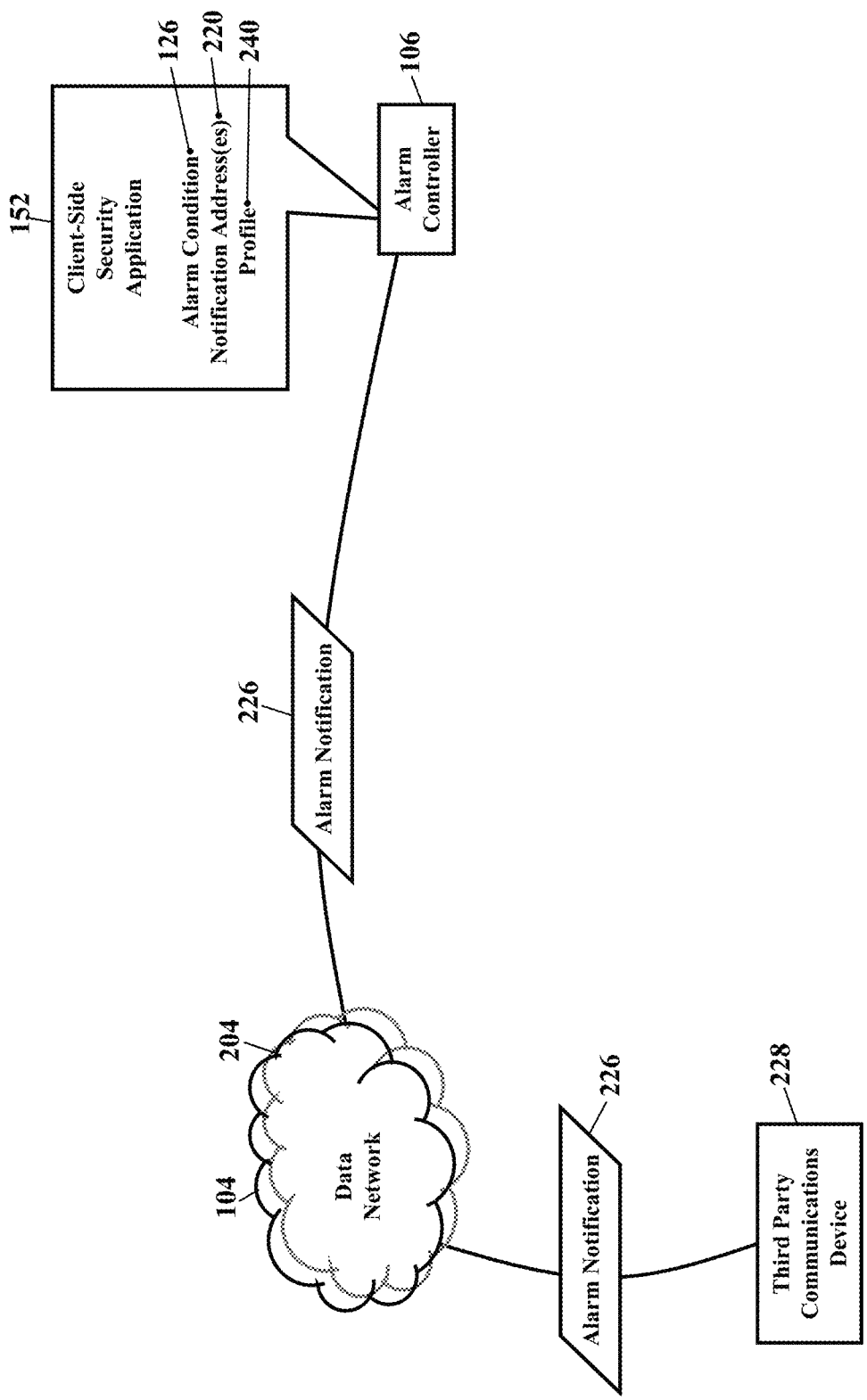

FIG. 8 is another schematic illustrating remote verification, according to exemplary embodiments. Here the alarm controller 106 itself may notify others when alarms are detected. When the alarm controller 106 detects the alarm condition 126, the client-side security application 152 may access the notification address 220 that is approved for remote notification. FIG. 8 illustrates the notification address 220 as being locally stored in the alarm controller 106, perhaps associated with a profile 240 of the occupant or home/business. If multiple notification addresses 220 are approved for remote notification, then the list of notification addresses (illustrated as reference numeral 224 in FIG. 7) may be retrieved. The client-side security application 152 formats the alarm notification 226 and sends the alarm notification 226 to each notification address 220 approved for remote notification. The alarm notification 226 may again include any information describing the alarm condition 126, the alarm sensor 108, and/or the physical street address.

Figure 9:
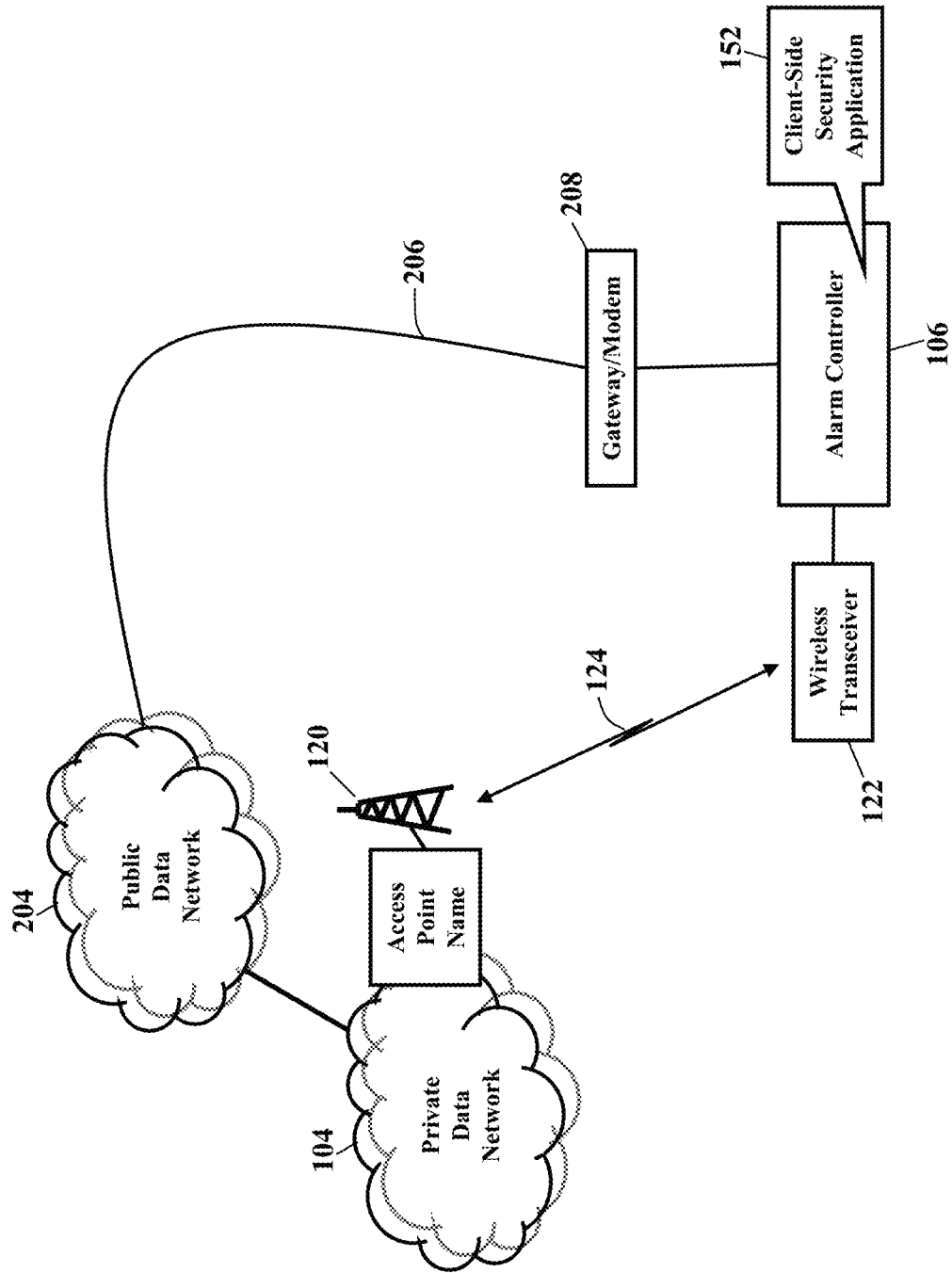
FIGS. 9-10 are schematics further illustrating the security system, according to exemplary embodiments.
Figure 10:
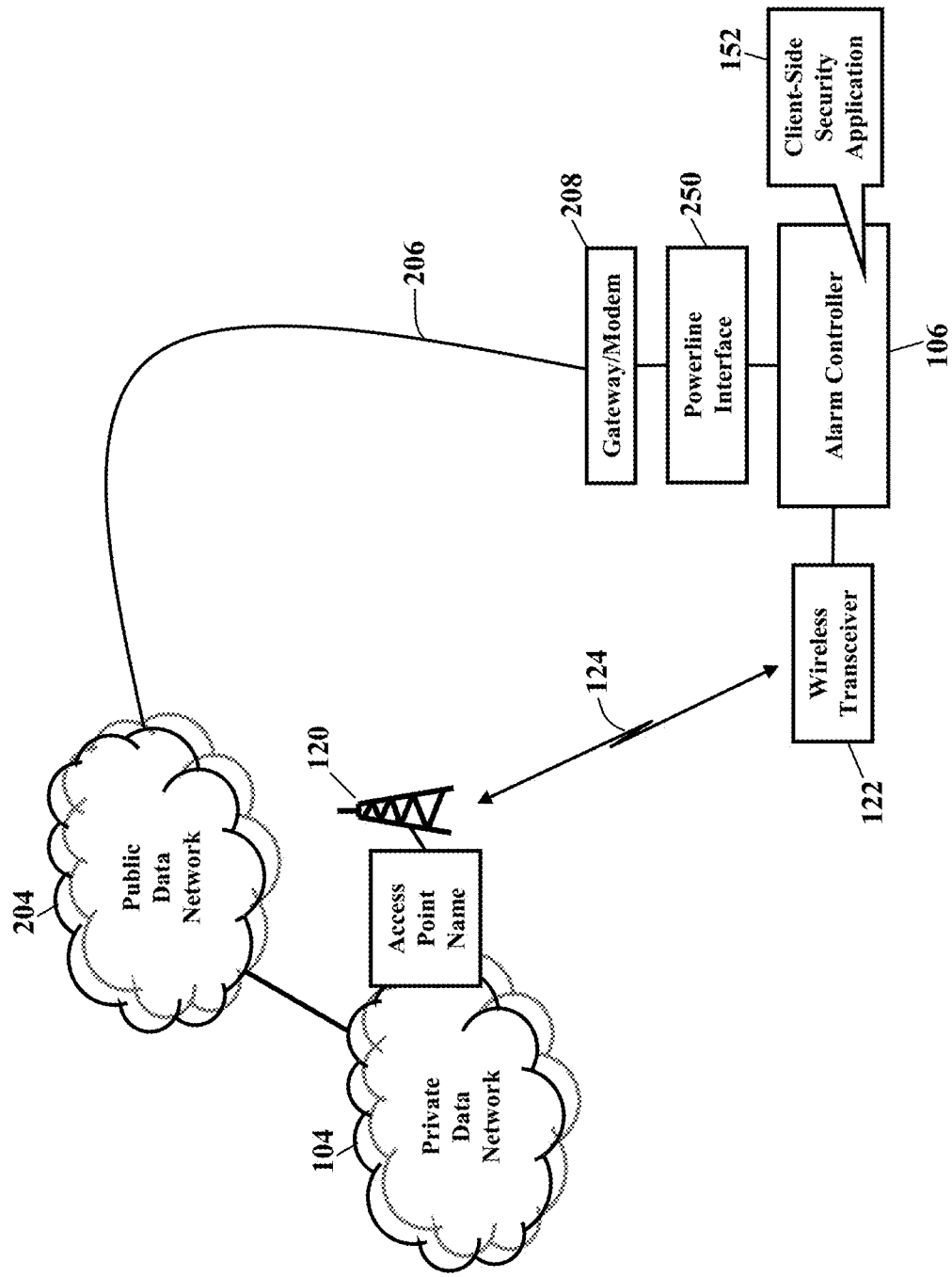

FIGS. 9-10 are schematics further illustrating the security system 100, according to exemplary embodiments. Here the residential or business security system 100 need not include a broadband modem. That is, the alarm controller 106 may simply plug-in, or interface to, an existing cable, digital subscriber line (DSL), or other gateway/modem device 208. FIG. 9, for example, illustrates a cable (e.g., CAT 5, 6, or 7) interconnecting a port of the occupant's existing gateway/modem device 208 to the alarm controller 106. FIG. 10 illustrates an alternative powerline interface 250 (such as HOMEPLUG®) that allows the occupant's existing gateway/modem device 208 to interface with the alarm controller 106. Exemplary embodiments thus allow the alarm controller 106 to be deployed in any home or business, regardless of the gateway/modem device 208 (e.g., ADSL, VDSL, GPON, and bring-your-own broadband).

FIGS. 11-14 are schematics illustrating the alarm sensor 108, according to exemplary embodiments. Here each alarm sensor 108 may have a wireless interface 260 to the alarm controller 106. Conventional security systems use wired sensors to detect security events. Wired sensors, though, are difficult to install after a home or business has been constructed. Exemplary embodiments may thus utilize the wireless interface 260 for easier and cheaper installations.

Figure 11:
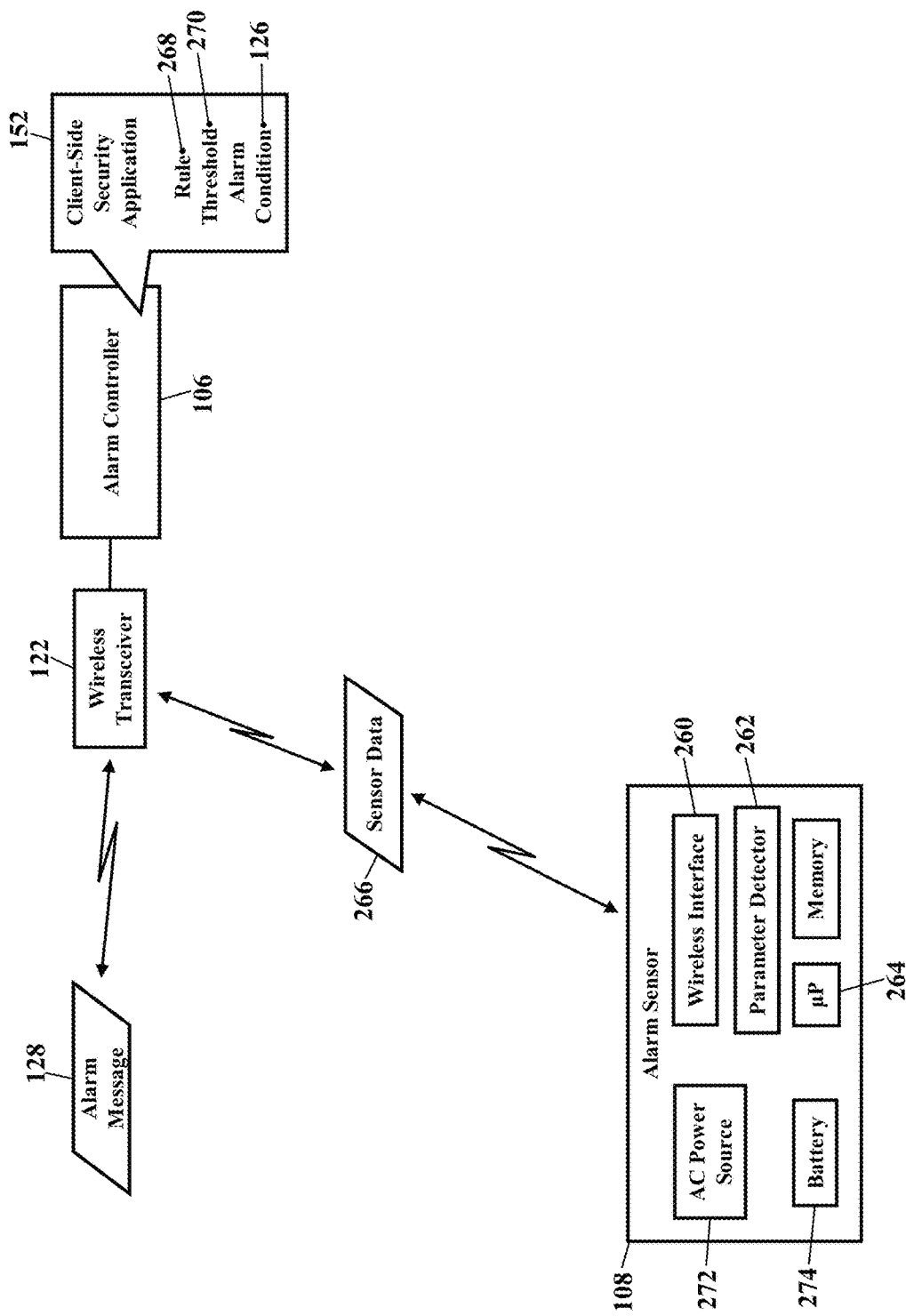
FIGS. 11-14 are schematics illustrating an alarm sensor, according to exemplary embodiments.

FIG. 11 is a block diagram of the alarm sensor 108. The alarm sensor 108 has a parameter detector 262 that detects or senses some physical or logical parameter (such as temperature, smoke, motion, or sound). A sensor processor 264 commands the wireless interface 260 to wirelessly send or broadcast sensor data 266. The sensor data 266 is wirelessly received by the alarm controller 106. The wireless transceiver 122 in the alarm controller 106, for example, may wirelessly receive the sensor data 266 sent from the alarm sensor 108. The client-side security application 152 obtains the sensor data 266 and compares the sensor data to one or more rules 268 and threshold values 270 stored in the alarm controller 106. If the sensor data 266 indicates a security event, the alarm condition 126 is determined and the alarm message 128 is sent to the central monitoring station 102 (as earlier paragraphs explained). While the alarm sensor 108 may have an alternating current (AC) power source 272, a battery 274 may be included.

Figure 12:
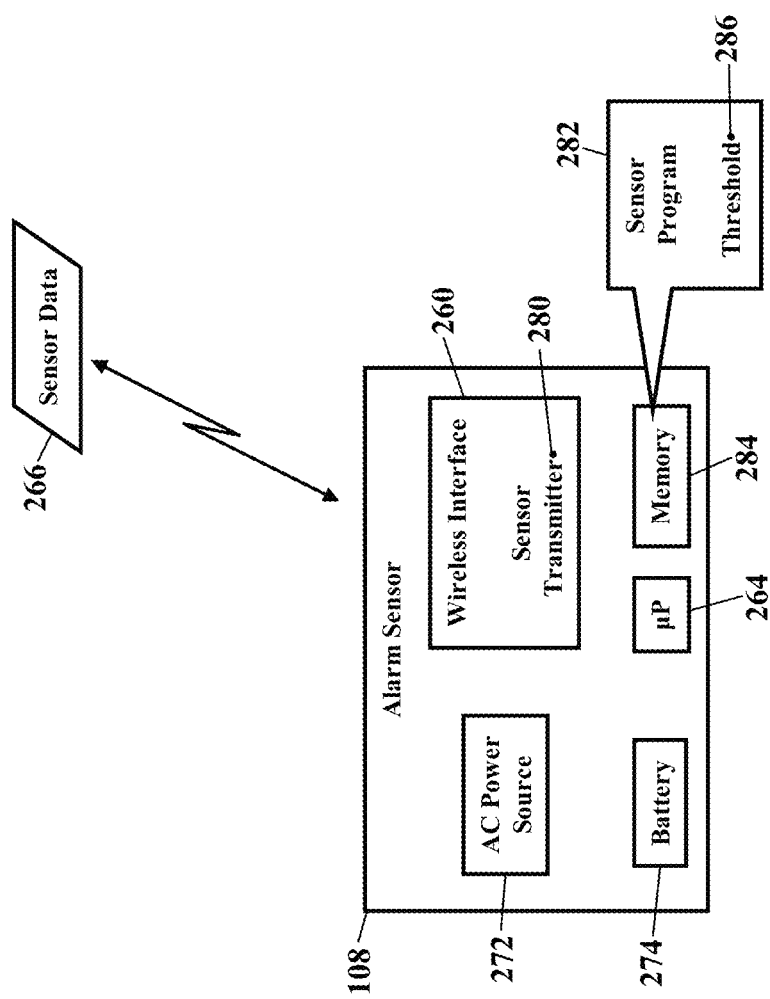

FIG. 12 further illustrates the wireless interface 260. Here the wireless interface 260 may only have one-way transmission capability to preserve battery life. That is, the alarm sensor 108 may only send the sensor data 266 to the alarm controller 106. A sensor transmitter 280 may thus lack capability to receive data or information to conserve the life of the battery 274. Because the alarm sensor 108 may only transmit the sensor data 266, electrical power from the battery 274 is not consumed for wireless reception. Even though the sensor transmitter 280 may utilize any portion of the electromagnetic spectrum, exemplary embodiments may utilize a proprietary portion (such as 433 MHz) of the electromagnetic spectrum. The sensor processor 264 executes a sensor program 282 stored in memory 284 of the alarm sensor 108. The sensor program 282 causes the sensor processor 264 to only broadcast the sensor data 266 during an alarm. Even though the alarm sensor 108 may continuously, periodically, or randomly monitor or measure the sensor data 266, the alarm sensor 108 may only transmit the sensor data 266 that equals or exceeds some threshold value 286. The sensor transmitter 280 may thus only consume electrical power from the battery 274 when the sensor data 266 necessitates.

Figure 13:
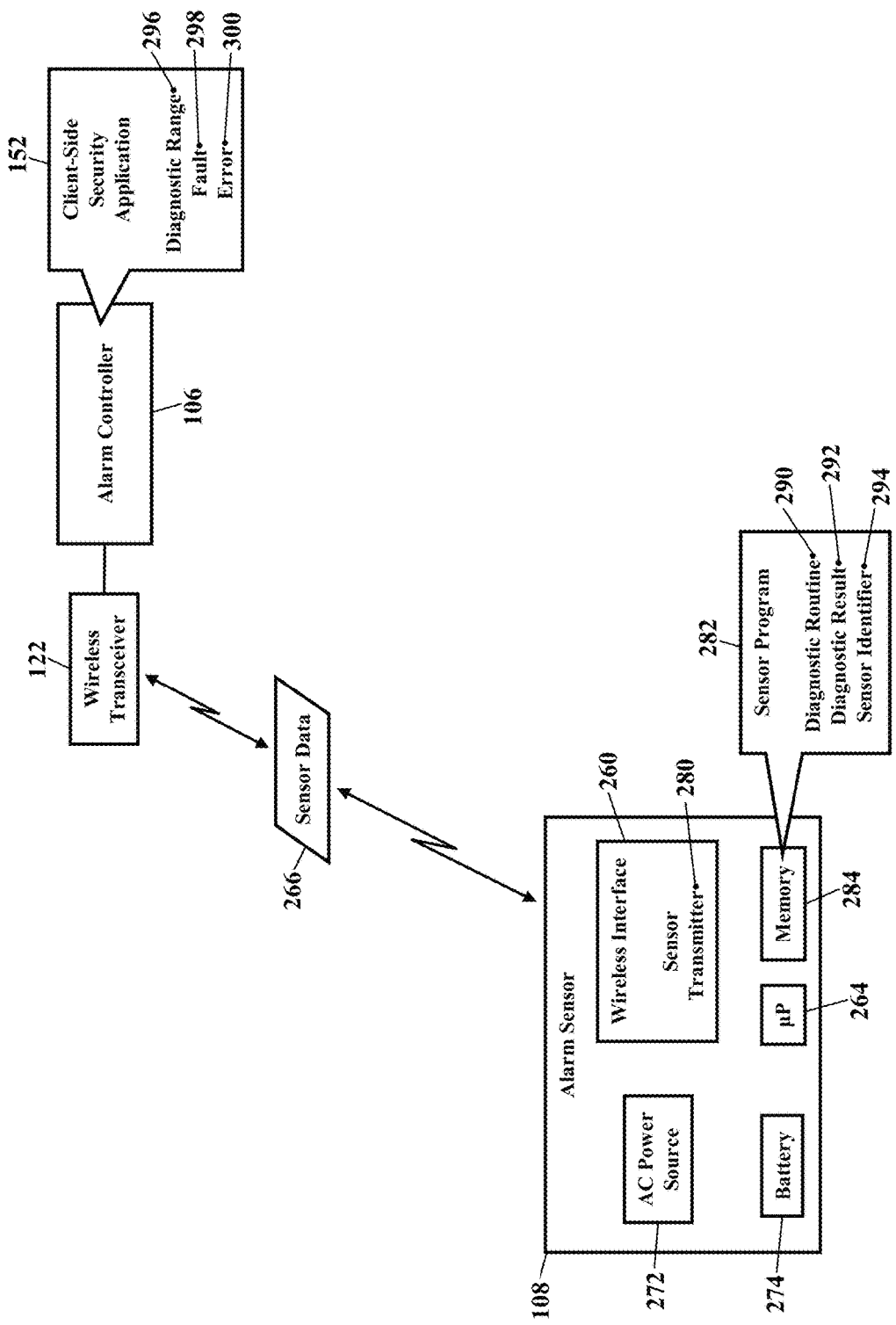

FIG. 13 further illustrates the wireless interface 260. Here the alarm sensor 108 may broadcast its health and identity. That is, the sensor program 282 may randomly or periodically execute a diagnostic routine 290, such as every seventy (70) minutes. The sensor transmitter 280 may then wirelessly send a diagnostic result 292, along with a sensor identifier 294 associated with the alarm sensor 108. The sensor identifier 294 may be any alphanumeric combination that uniquely identifies the alarm sensor 108 from other alarm sensors. When the alarm controller 106 receives the diagnostic result 292 and the sensor identifier 294, the client-side security application 152 may compare the diagnostic result 292 to a diagnostic range 296 of values. If the diagnostic result 292 satisfies the diagnostic range 296 of values, then the alarm sensor 108 is assumed to be properly functioning. If the diagnostic result 292 fails to satisfy the diagnostic range 296 of values, then a fault 298 may be assumed and the alarm controller 106 may flag and/or display an error 300 associated with the sensor identifier 294.

The one-way wireless interface 260 may be best suited to magnetic sensors. As those of ordinary skill in the art have known, many security systems utilize magnetic sensors for doors and windows. When a door or window opens, a magnet (not shown) pulls away from a metal strip or contact. As the magnet pulls away, the magnet electromagnetically decouples, thus opening like a switch in a circuit. The alarm sensor 108 thus simply detects low or no current, voltage, or continuity as the door or window opens. The sensor program 282 may thus cause the sensor processor 264 and the sensor transmitter 280 to broadcast the sensor data 266 (e.g., low or no current, voltage, or continuity) only when the magnet pulls away from the door or window. The one-way transmission capability of the wireless interface 260 may thus be effectively used for windows and doors, where the life of the battery 274 may be extended three to five years.

Figure 14:
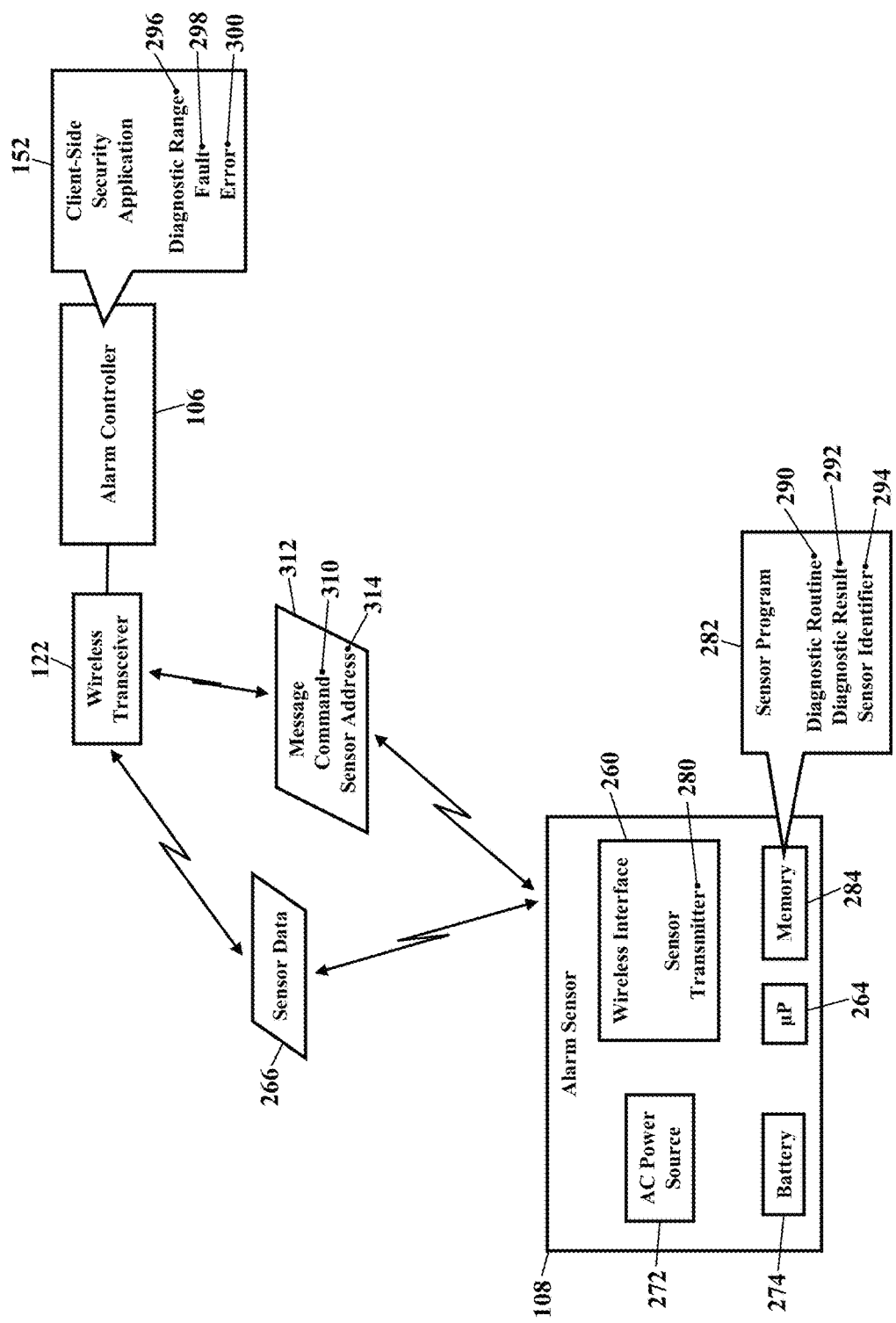

FIG. 14 illustrates two-way capability. Here the wireless interface 260 may both send and receive, thus bi-directionally communicating with the alarm controller 106. FIG. 14, for example, illustrates an initialization of the alarm sensor 108. The alarm sensor 108 may response to a command 310 sent in a message 312 from the alarm controller 106. The command 310 may instruct the alarm sensor 108 to turn on, to awaken, or to respond. The message 312 may also include a sensor address 314, thus permitting different alarm sensors 108 to be individually addressed and activated/deactivated. When the alarm sensor 108 receives the message 312, the alarm sensor 108 executes the command 310, as instructed by the alarm controller 106. The alarm sensor 108 may respond by sending the sensor data 266 to the alarm controller 106. The alarm sensor 108 may also broadcast its diagnostic result 292 and the sensor identifier 294 to indicate its health and identity (as the above paragraph explained). When the alarm sensor 108 has two-way capability, the sensor transmitter 280 may again utilize any portion of the electromagnetic spectrum, such as the 900 MHz spectrum. This two-way capability consumes more electrical power from the battery 274, so the two-way capability may be reserved for keypads and for sensors that are easily accessed.

Figure 15:
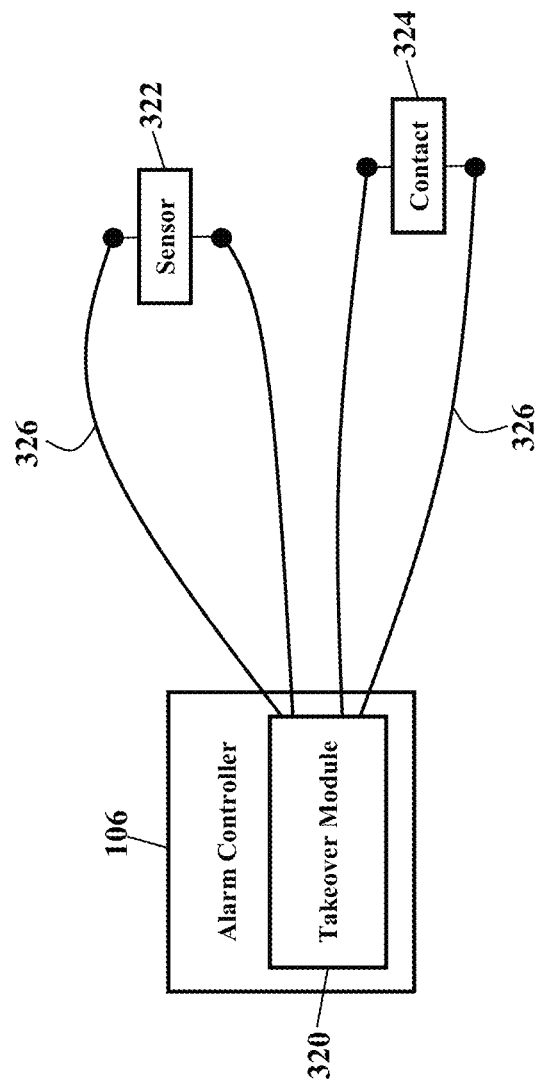
FIGS. 15-18 are schematics illustrating a takeover module, according to exemplary embodiments.
Figure 16:
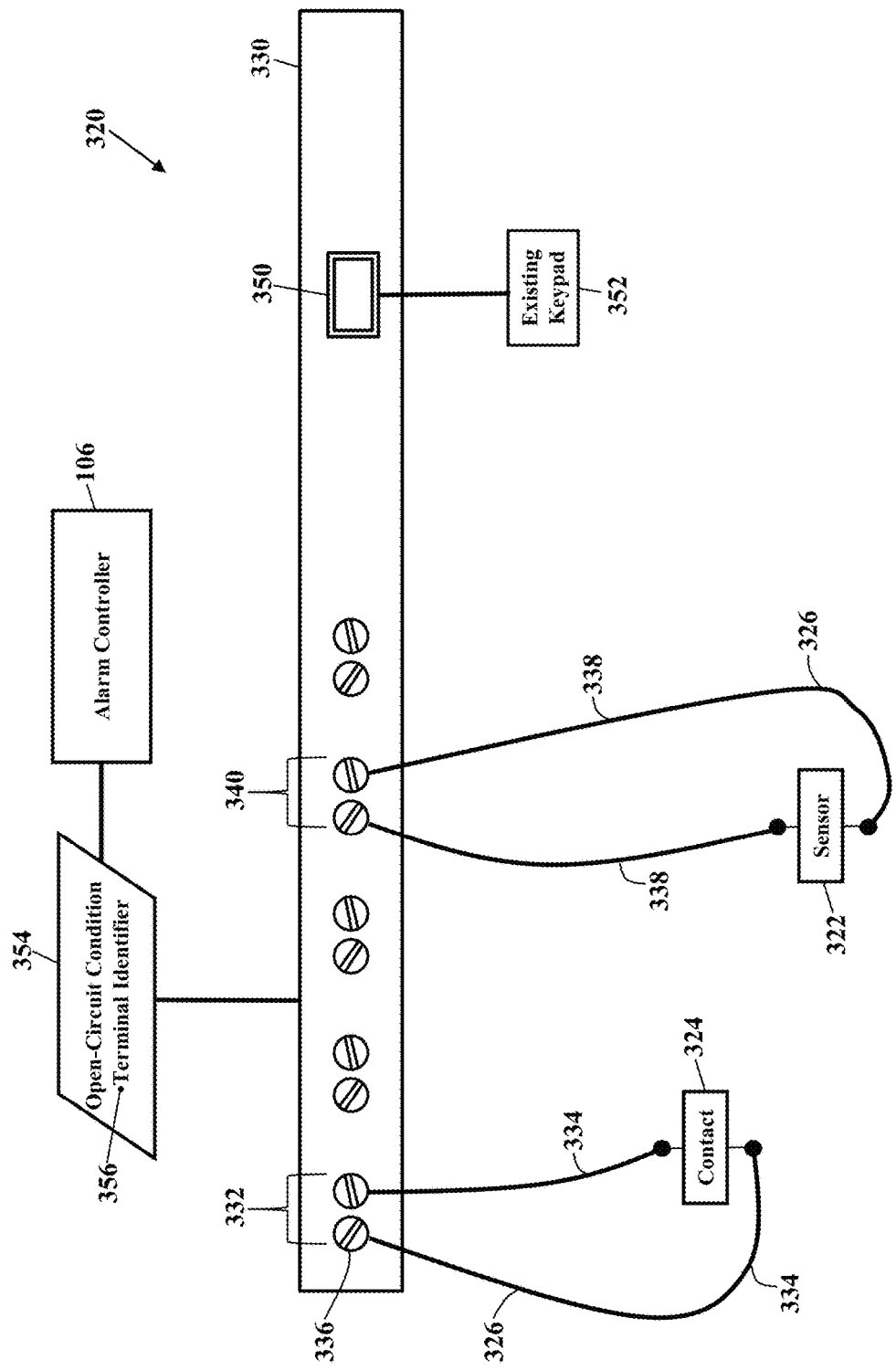
Figure 17:
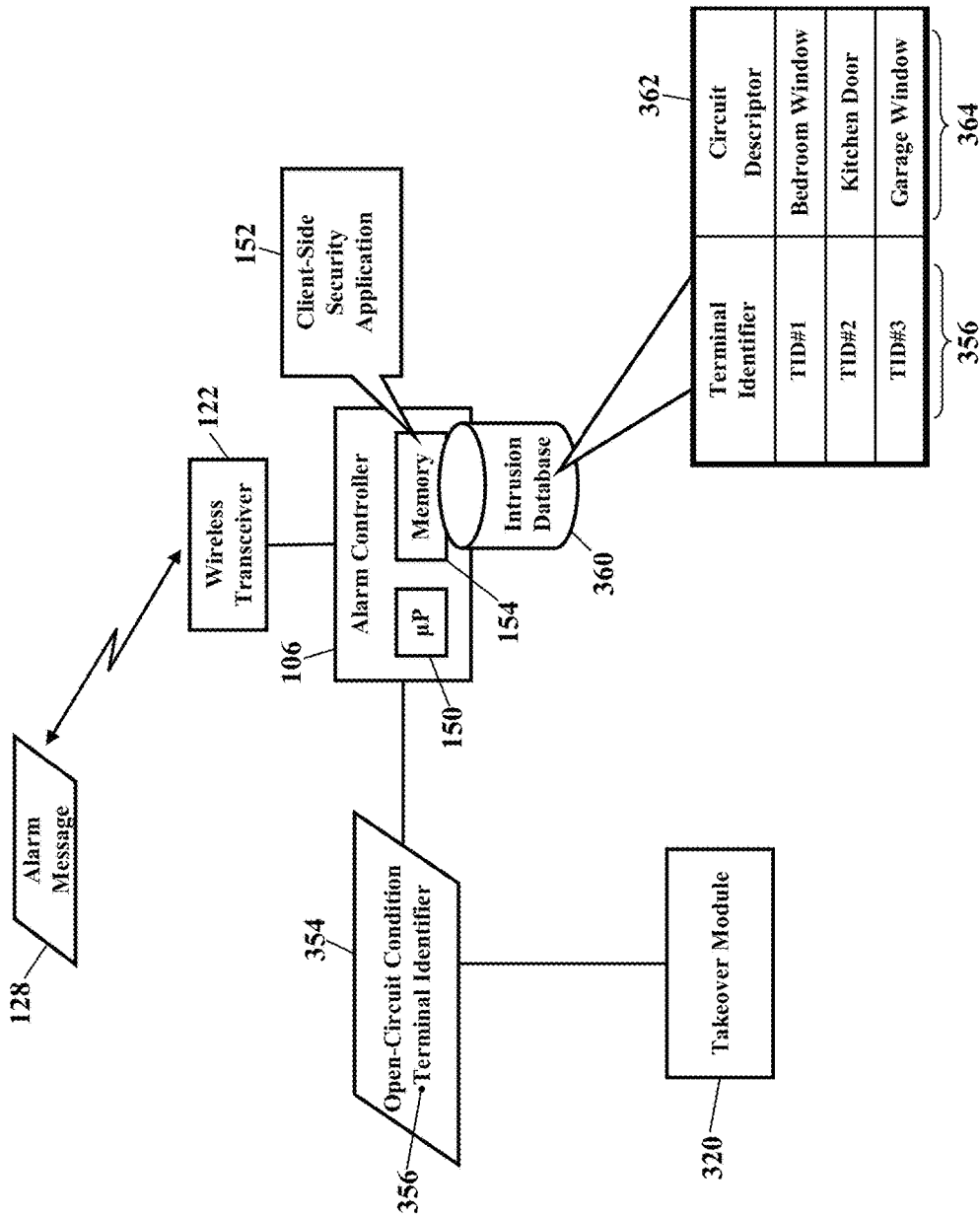

FIGS. 15-17 are schematics illustrating a takeover module 320, according to exemplary embodiments. The takeover module 320 allows exemplary embodiments to be retrofitted to one or more existing wired sensors 322 and/or wire contacts 324. As earlier paragraphs explained, conventional security systems have long used the wired contacts 322 and sensors 324 to detect security events. Because these existing wired contacts 322 and sensors 324 may still adequately function for basic security services, some customers may not want to incur added costs to tear-out aged, but functioning, components. The takeover module 320 thus allows the alarm controller 106 to interface with existing wired keypads, sirens, and sensors in older installations. An existing controller may be removed, and the existing alarm zones, or circuits 326, may be interfaced to the alarm controller 106. The takeover module 320 thus permits older security systems to be up-fitted without incurring substantial installation costs.

As FIG. 16 illustrates, the takeover module 320 has one or more terminal strips 330 of pairs 332 of terminals. An existing pair 334 of wires from the existing window contact 324 is connected to a first pair 336 of terminals in the takeover module 320. A second existing pair 338 of wires from the existing sensor 322 is connected to a second pair 340 of terminals. If multiple circuits serve multiple existing security components, then each corresponding pair of wires is connected to a different pair 332 of terminals in the takeover module 320. A different pair 332 of terminals, in other words, is connected to each two-wire pair in a security circuit 326. The takeover module 320 may also have a socket 350 for connection to an existing keypad 352. The takeover module 320 applies an electrical current to each pair 332 of terminals. The electrical current flows through the existing circuits 326 and returns back to each respective pair 332 of terminals in the takeover module 320. As earlier paragraphs explained, when a window or door is opened, the corresponding wired component (e.g., the existing sensor 322 or the existing window contact 324) creates an open-circuit condition. When the circuit 326 opens, the takeover module 320 detects no current between the corresponding pair 332 of terminals. The takeover module 320 thus reports an open-circuit condition 354 to the alarm controller 106, along with a terminal identifier 356 associated with the open circuit.

As FIG. 17 illustrates, exemplary embodiments may thus detect intrusion events. When an open circuit is detected, the alarm controller 106 receives the open-circuit condition 354 and the terminal identifier 356. The client-side security application 152 may then query an intrusion database 360. FIG. 17 illustrates the intrusion database 360 stored in the memory 154 of the alarm controller 106, but the intrusion database 360 may be stored in the takeover module 320 or remotely accessed from the data network (illustrated as reference numeral 104 in FIG. 1). Regardless, the intrusion database 360 is illustrated as a table 362 that maps, relates, or associates terminal identifiers 356 to circuit descriptors 364. Each circuit descriptor 364 may be a textual description of an existing sensor circuit (illustrated as reference numeral 326 in FIGS. 15 & 16). The intrusion database 360 thus provides a simple description of a possible intrusion event, such as "master bedroom window open" or "garage door open." The client-side security application 152 queries the intrusion database 360 for the terminal identifier 356 associated with the open-circuit condition 354 detected by the takeover module 320. The client-side security application 152 retrieves the corresponding circuit descriptor 364 and sends the alarm message 128 to the central alarm receiver 130 (as earlier paragraphs explained). The alarm message 128 may thus include a textual description of the security event (such as "glass breakage in garage" or "kitchen door open"). Should the central monitoring station server 132 send the alarm notification (illustrated as reference numeral 226 in FIGS. 7-8) for remote notification, the alarm notification 226 may, likewise, include the textual description of the security event.

Figure 18:
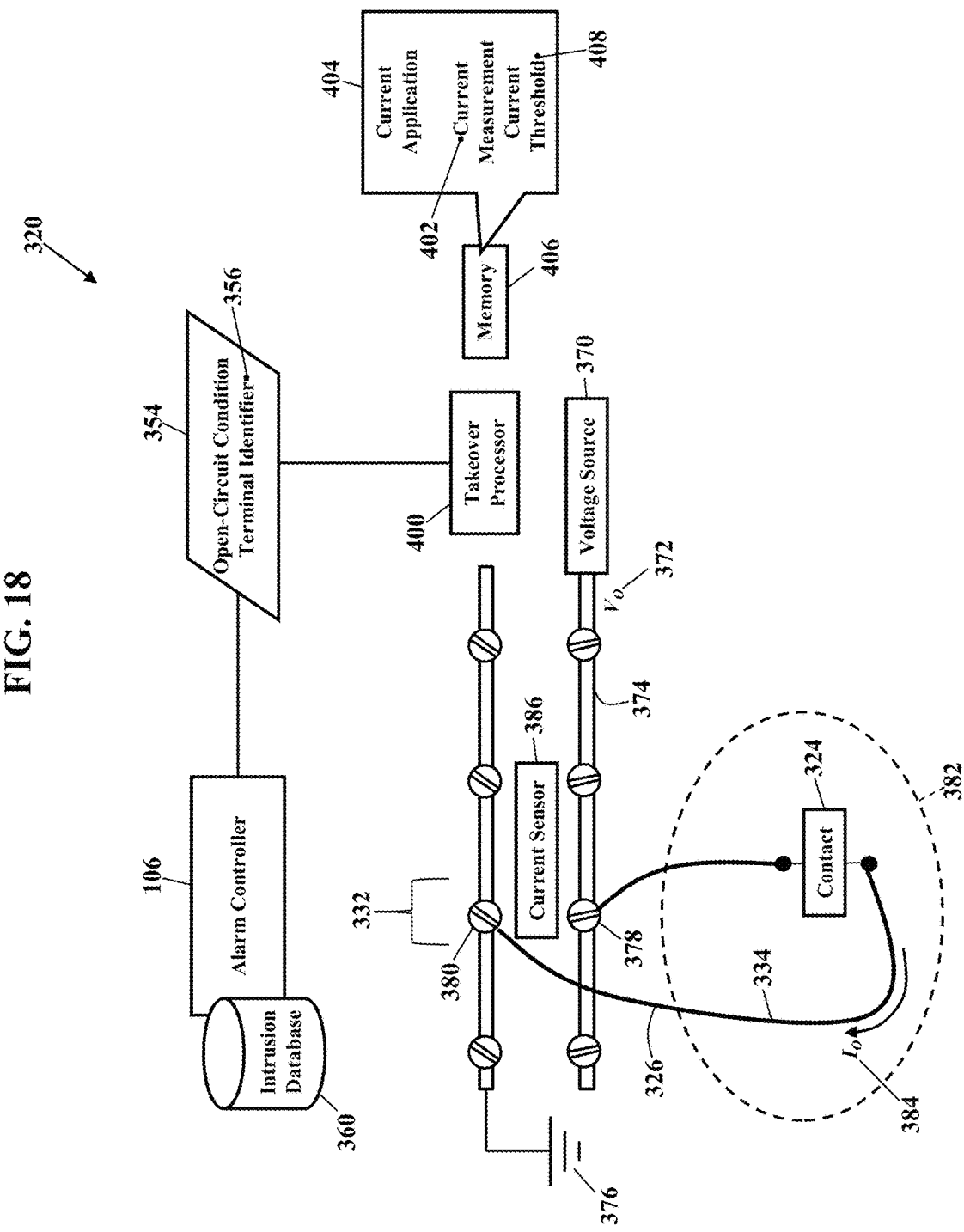

FIG. 18 is a block diagram of the takeover module 320, according to exemplary embodiments. The takeover module 320 has a voltage source 370 that applies a voltage $V_O$ (illustrated as reference numeral 372) to a voltage strip 374. Each pair 332 of terminals in the takeover module 320 has one terminal electrically connected to the voltage strip 374 and a second terminal electrically connected to electrical ground 376. The voltage $V_O$, for example, is applied to a first terminal 378 in the pair 332 of terminals, while a second terminal 380 is connected to electrical ground 376. Because the existing wires 334 and the existing wired contact 324 electrically resemble a resistance 382 (as may the existing wires 338 and sensor 322 illustrated in FIG. 16), electrical current $I_O$ (illustrated as reference numeral 384) flows from the first terminal 378 (to which the voltage $V_O$ is applied), through the existing wires 334 and the existing contact 324, and to the second terminal 380 connected to electrical ground 376. Each pair 332 of terminals in the takeover module 320 may have a current sensor 386 that measures the electrical current $I_O$ flowing from the first terminal 378 to the second terminal 380.

The takeover module 320 may be processor controlled. A takeover processor 400 may receive a current measurement 402 from each current sensor 386. The takeover processor 400 may execute a current application 404 stored in memory 406. The current application 404 is software code or instructions that cause the takeover processor 400 to evaluate or to compare the current measurement 402 in each circuit 326 to a threshold current value 408. When the current measurement 402 across any pair 332 of terminals drops below the threshold current value 408, the takeover processor 400 detects a possible intrusion event. The takeover processor 400 flags the open-circuit condition 354 and obtains the terminal identifier 356 of the open circuit from the corresponding current sensor 386. The takeover processor 400 sends the open-circuit condition 354 to the alarm controller 106 (perhaps as a message), along with the terminal identifier 356 of the open circuit. When the alarm controller 106 receives the open-circuit condition 354, the client-side security application 152 may query the intrusion database 360 for the terminal identifier 356 of the open circuit. The client-side security application 152 may then send the alarm message 128 to the central alarm receiver 130 (as earlier paragraphs explained).

Figure 19:
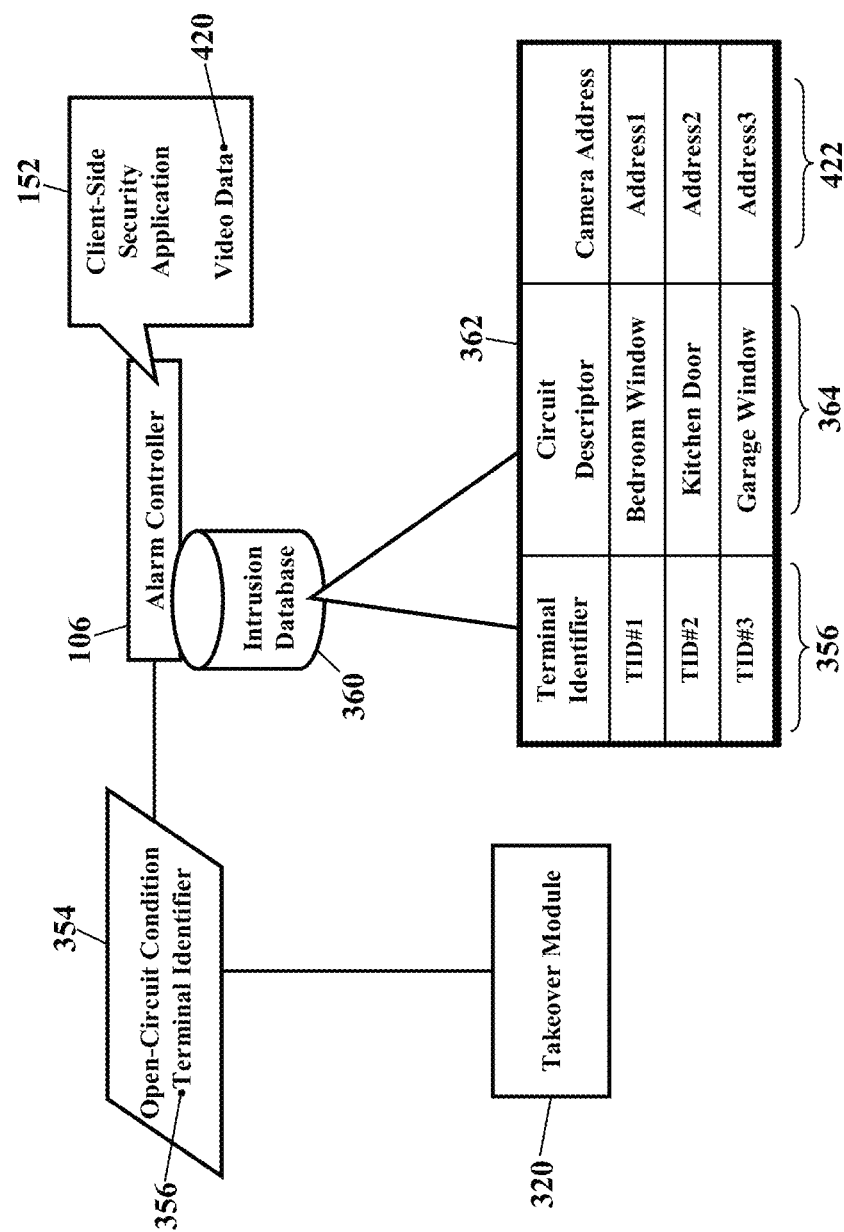
FIGS. 19-21 are schematics illustrating video data, according to exemplary embodiments.
Figure 20:
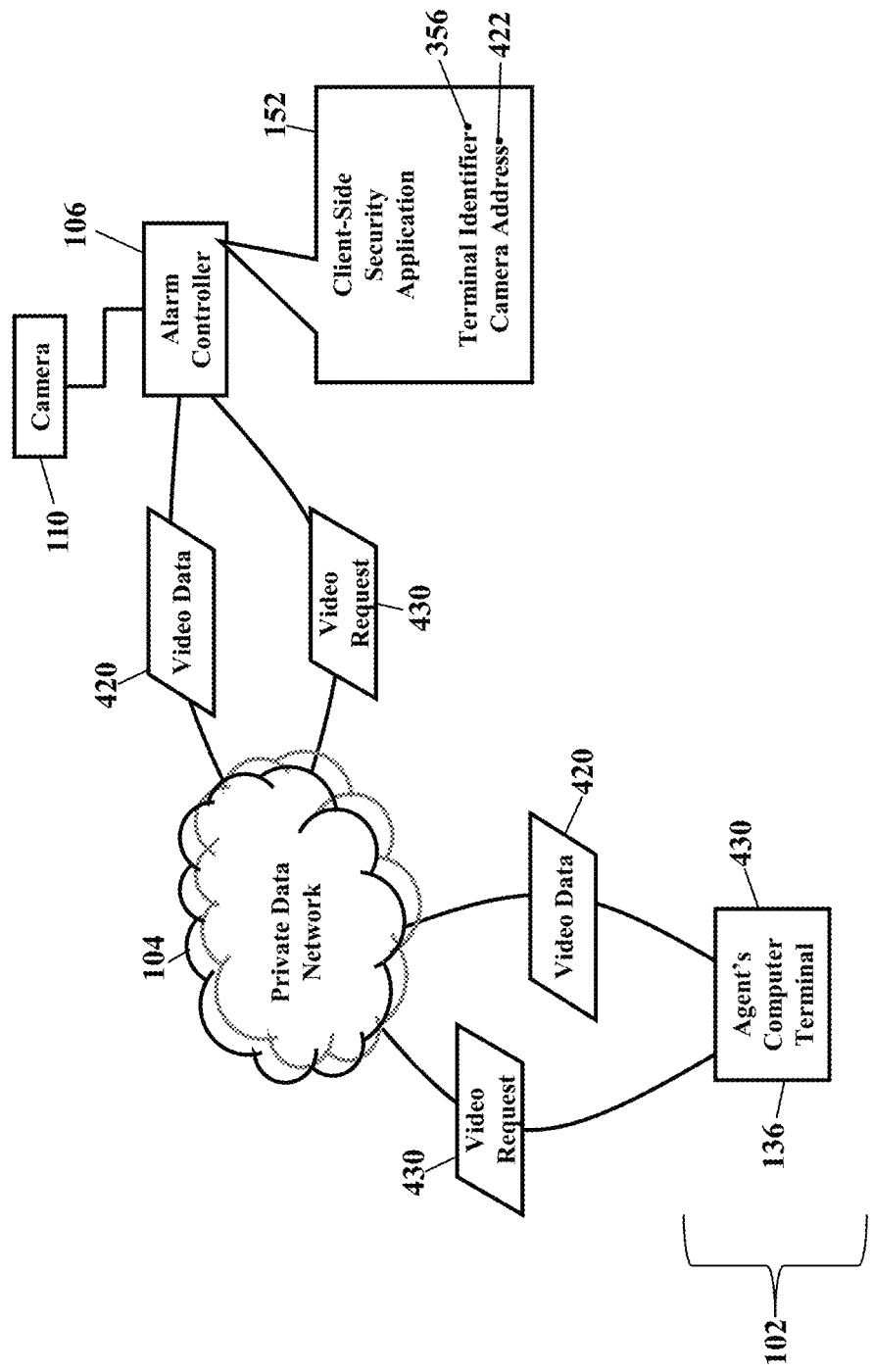
Figure 21:
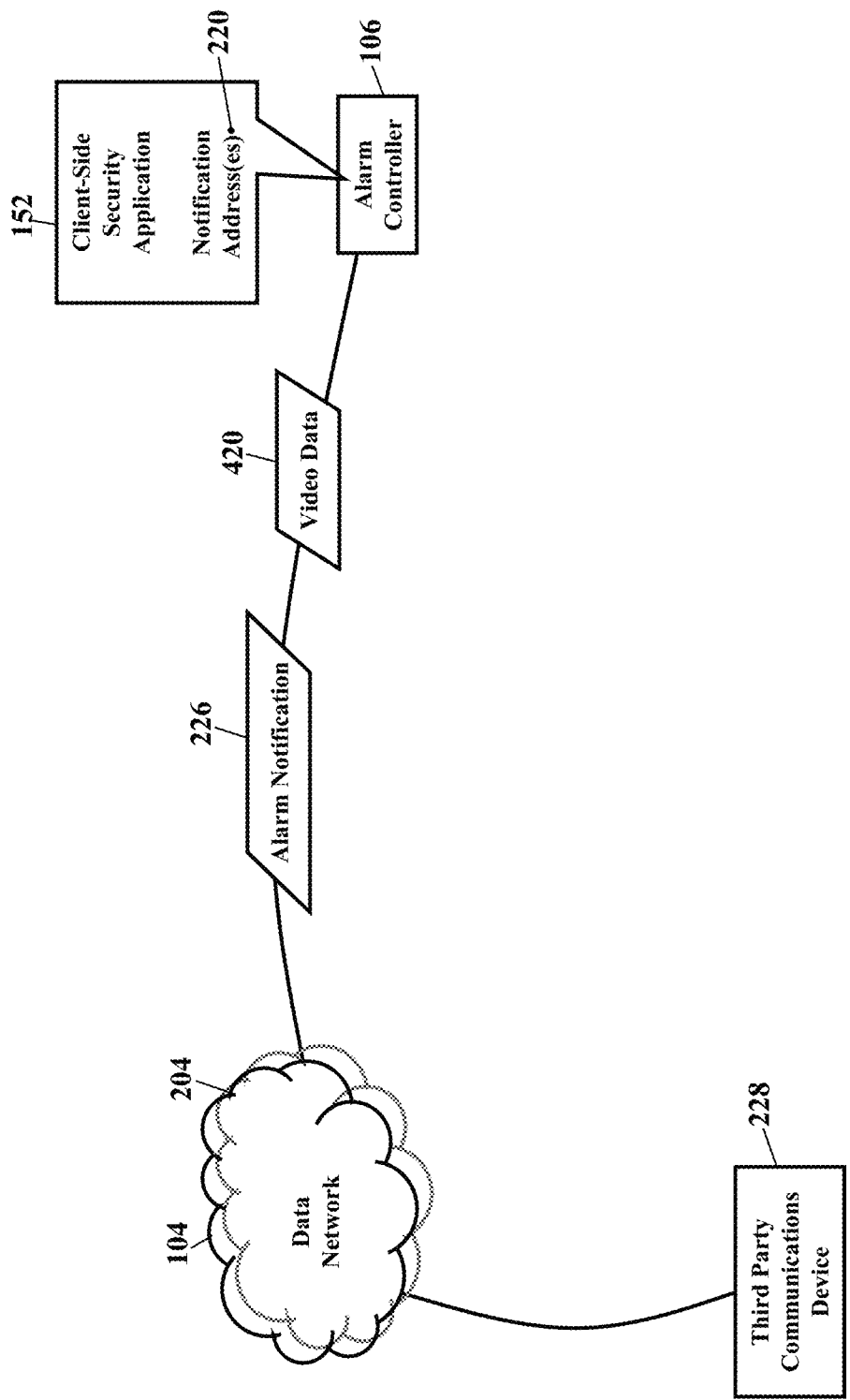

FIGS. 19-21 are schematics illustrating video data, according to exemplary embodiments. Because there may be multiple cameras (illustrated as reference numeral 110 in FIG. 1) installed in a home or business, exemplary embodiments may obtain video data 420 of the possible intrusion (detected by the takeover module 320, as explained above). Here exemplary embodiments may select the video data 420 that corresponds to the terminal identifier 356. As FIG. 19 illustrates, the intrusion database 360 may also associate a camera 110 to the circuit descriptor 364. The intrusion database 360 may be configured to relate different cameras and/or camera views to terminal identifier 356. Camera #1, for example, may be trained or aimed on the kitchen door, while camera #2 captures a front entry door. Cameras may be installed throughout a home or business to provide views of many windows, doors, and other locations. If a camera is motorized to pan and/or to zoom, then the camera may also have multiple orientations for multiple views. The intrusion database 360 may thus store relationships that best capture the video data 420 of the terminal identifier 356 associated with the open circuit. When the client-side security application 152 receives the terminal identifier 356 associated with the open circuit, the client-side security application 152 may thus select only the most relevant video data 420. When the client-side security application 152 queries the intrusion database 360 for the terminal identifier 356, the client-side security application 152 may also retrieve a camera address 422. Because there may be multiple cameras throughout a home or business, each camera may be uniquely identified by the camera address 422 (such as a public or private Internet protocol address). Each camera is likely trained or aimed to capture video of different portions of the home or business. The client-side security application 152 thus retrieves the camera address 422 that is associated with the terminal identifier 356. Once the camera address 422 is known, exemplary embodiments may obtain the video data 420 to further verify the intrusion.

FIG. 20 illustrates the video data 420. The agent 136 at the central monitoring station 102 may send a video request 430 instructing the alarm controller 106 to retrieve and send the video data 420 captured by the camera 110 associated with the terminal identifier 356. When the alarm controller 106 receives the video request 430, the client-side security application 152 retrieves live and/or archived video data 420 associated with the corresponding camera address 422. The alarm controller 106 sends the relevant video data 420 to some network address (such as the agent's computer terminal 432). The agent 136 may thus view the video data 420 to help verify the intrusion.

The video data 420, however, may be automatically sent. When the takeover module 320 detects the open-circuit condition 354, the client-side security application 152 may be programmed or configured to automatically sent the video data 420. This automatic response may be desired when bandwidth is not a concern, such as holidays or hours when the data network 104 is uncongested. The client-side security application 152 may thus automatically retrieve and send the video data 420 whenever the open-circuit condition 354 is received from the takeover module 320. When the open-circuit condition 354 is detected, the client-side security application 152 may automatically query for the camera address 422 associated with the terminal identifier 356. The client-side security application 152 retrieves the video data 420 from the camera 110 at the camera address 422. The client-side security application 152 may then send the video data 420 with the alarm message 128 and/or with the alarm notification 226.

The agent 136 (at the agent's computer terminal 430) may request video from any camera 110. As the agent 136 attempts to verify the alarm, the agent may select any of the cameras 110 in the home or business and receive streaming video data 420. The agent's computer terminal 430 may even display information indicating the camera, camera zone, and/or the alarm condition 126. The agent's computer terminal 430 may also display a graphical user interface that permits the agent 136 to access the live video data 420 from any camera 110 in the home or business. Under most circumstances the agent 136 will receive and view the live video data 420 from one camera 110 at a time. If bandwidth permits, though, the agent may select and view live video data 420 from multiple cameras 110 at one time. The live video data 420 will not create congestion in the private data network 104, so the only congestion may occur in the customer's access network. For example, if a customer has a wireline broadband ADSL service with 1.5 Mbps downstream and 256 Kbps upstream, the upstream bandwidth could be limiting.

Any video data, from any camera 110, is also available. As the agent attempts to verify the alarm, the agent 136 may want video data 420 from other cameras in the home or business. The agent's computer terminal 430 need only send the video request 430 and specify output from a particular camera. The client-side security application 152 retrieves and sends the live video data 420 associated with the requested camera number.

Some cameras, though, may be off limits to the agent. Even though the customer may have multiple cameras, the customer may not want the agent to have access to all cameras. That is, there may be some camera outputs that are "off limits" and not accessible. A bedroom security camera, for example, may be configured as "private," not shared, and perhaps not archived. Permissions may thus be established for each camera. The customer may thus establish a policy to manage which camera outputs are available to the central monitoring station during an alarm condition. The client-side security application 152 may be configured to permit, or deny, remote access to any output of any camera 110 according to user and/or the user's location. If a user has acceptable authentication credentials (e.g., username and password), but an unacceptable location (such as GPS coordinates), then the client-side security application 152 may deny access to video and any other feature. Some camera output may be associated with public permissions, while other camera output may be associated with specific authentication credentials.

FIG. 21 illustrates remote notification of the video data 420. Earlier paragraphs explained how the alarm notification 226 may remotely notify friends, family members, or others of security events detected by the alarm controller 106. When the alarm notification 226 is sent to one or more of the notification addresses 220, the alarm notification 226 may include at least a portion of the video data 420. When the alarm notification 226 is received, the recipient may immediately read the textual description of the open circuit ("basement window open") and view the video data 420 captured by a camera. The recipient may thus immediately verify the intrusion event. If bandwidth, packet delay, or other network factor is a concern, the alarm notification 226 may only include a website link to the video data 420.

Figure 22:
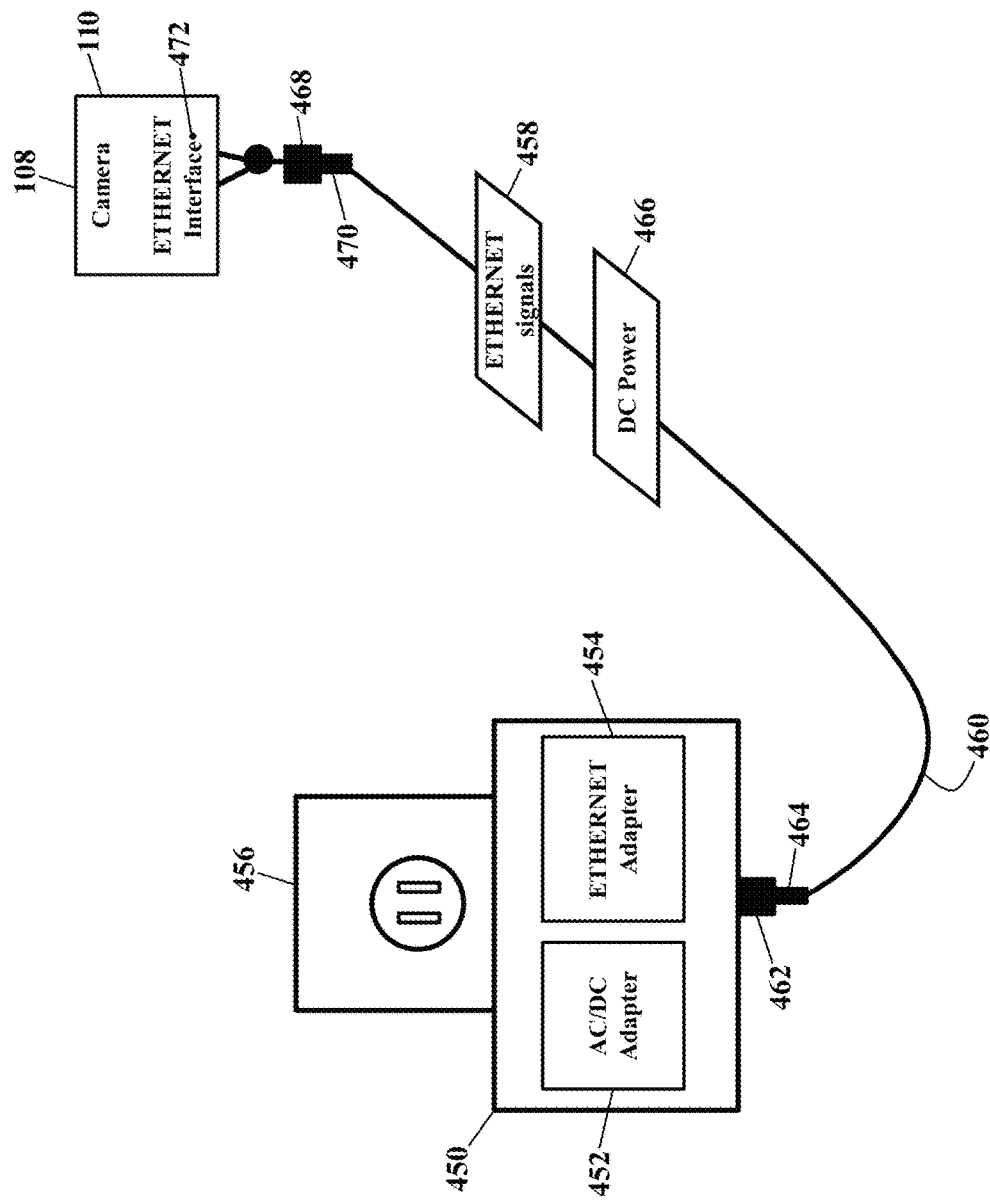
Figure 23:
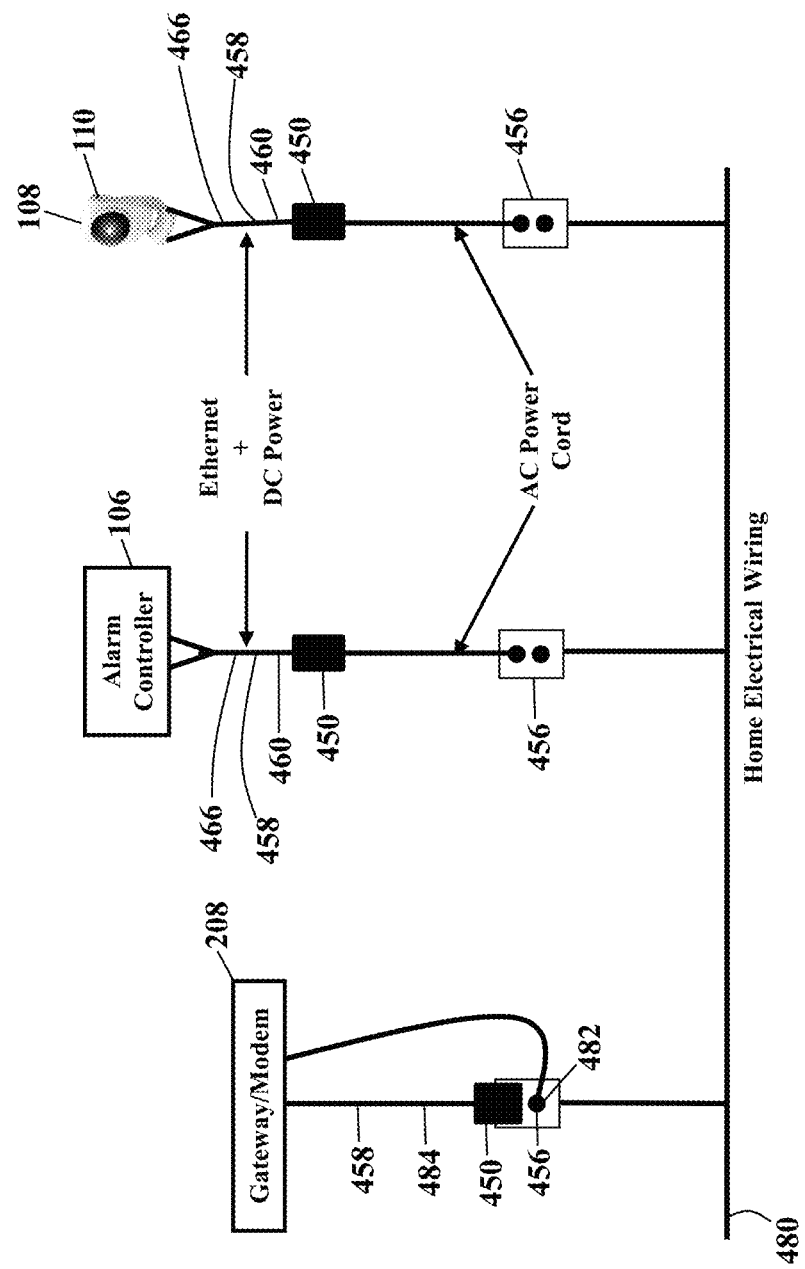

FIGS. 22-24 are schematics illustrating a powerline-to-Ethernet adapter 450, according to exemplary embodiments. Here the existing electrical wiring in a home or business is used to convey ETHERNET® signals from the alarm sensors 108. FIG. 22 illustrates the basic concept of an AC/DC power adapter 452 with an integrated ETHERNET® adapter 454. The AC/DC power adapter 452 may have a standard two-prong or three-prong male plug for insertion into a standard female electrical outlet 456. The AC/DC power adapter 452 receives alternating electrical voltage and current and converts to direct current (DC) electrical power. The ETHERNET® adapter 454 outputs ETHERNET® signals 458 (or "frames"). Here, though, both DC electrical power 466 and the ETHERNET® signals 458 are conveyed by one or more wires in a cable 460. DC voltage and current are also output to two or more other wires in the cable 460. A six-wire cable 460, for example, may convey the ETHERNET® signals 458 on four (4) of the six wires, while direct current electrical power is conveyed over a remaining two wires of the six wires. As FIG. 22 also illustrates, a female connector 462 allows the cable 460 to mate with the powerline-to-Ethernet adapter 450. The female connector 462, for example, may be an RJ-56 modular jack, thus allowing a male RJ-56 plug 464 of an end of the cable 460 to insert into the female connector 462. The AC/DC power adapter 452 outputs the DC power 466 to at least two (2) terminals in the female connector 462, while the ETHERNET® adapter 454 outputs the ETHERNET® signals 458 to other terminals in the female connector 462. Both the ETHERNET® signals 458 and DC power 466 are conveyed by the cable 460 from the powerline-to-Ethernet adapter 450 to the alarm sensor 108. FIG. 22 illustrates the alarm sensor 108 as an Internet Protocol digital camera 110 that captures the video data (illustrated as reference numeral 420 in FIGS. 19-21). FIG. 22, though, may be utilized for any sensor 108. The sensor 108 also has a corresponding RJ-56 female modular jack 468 that accepts a male RJ-56 plug 470 of an opposite end of the cable 460. The RJ-56 female modular jack 468 thus receives both the ETHERNET® signals 458 and the DC electrical power 466 conveyed by the wires in the cable 460. The two wires conveying the DC power 466 are connected to terminals and circuitry that electrically powers the Internet Protocol digital camera 110, while the wires delivering the ETHERNET® signals 458 are connected to terminals and an ETHERNET® interface 472.

FIG. 23 further illustrates the powerline-to-Ethernet adapter 450. The existing electrical wiring 480 provides AC electrical power to the electrical outlets 456 throughout the home or business. The customer's gateway/modem 208 may have a conventional male plug 482 that inserts into a first receptacle of the electrical outlet 456 to receive AC electrical power. The powerline-to-Ethernet adapter 450 may also plug into a second receptacle of the electrical outlet 456. The ETHERNET® signals 458 are conventionally conveyed over a conventional cable 484 to the customer's gateway/modem 208, while AC electrical power is supplied over a conventional electrical cord to the gateway/modem 208. Here, then, the customer's gateway/modem 208 may be conventionally installed to receive both the ETHERNET® signals 458 and AC electrical power from the electrical outlet 456.

FIGS. 23 and 24, though, further illustrate the powerline-to-Ethernet adapter 450. The powerline-to-Ethernet adapter 450 may be utilized by either the alarm controller 106 and/or the alarm sensor 108 (such as the Internet Protocol digital camera 110). The powerline-to-Ethernet adapter 450, for example, may provide both the ETHERNET® signals 458 and the DC electrical power 466 to the alarm controller 106. Another powerline-to-Ethernet adapter 450 may provide both the ETHERNET® signals 458 and the DC electrical power 466 to the Internet Protocol digital camera 110. Some wires in the cable 460 convey the DC electrical power 466, while other wires in the cable 460 convey the ETHERNET® signals 458 (as the above paragraphs explained).

Exemplary embodiments may thus utilize any of the HOMEPLUG® specifications. HOMEPLUG® is one common power line communications specification for networking over existing home electrical wiring. Because the HOMEPLUG® specifications are known, no detailed explanation is necessary.

Figure 25:
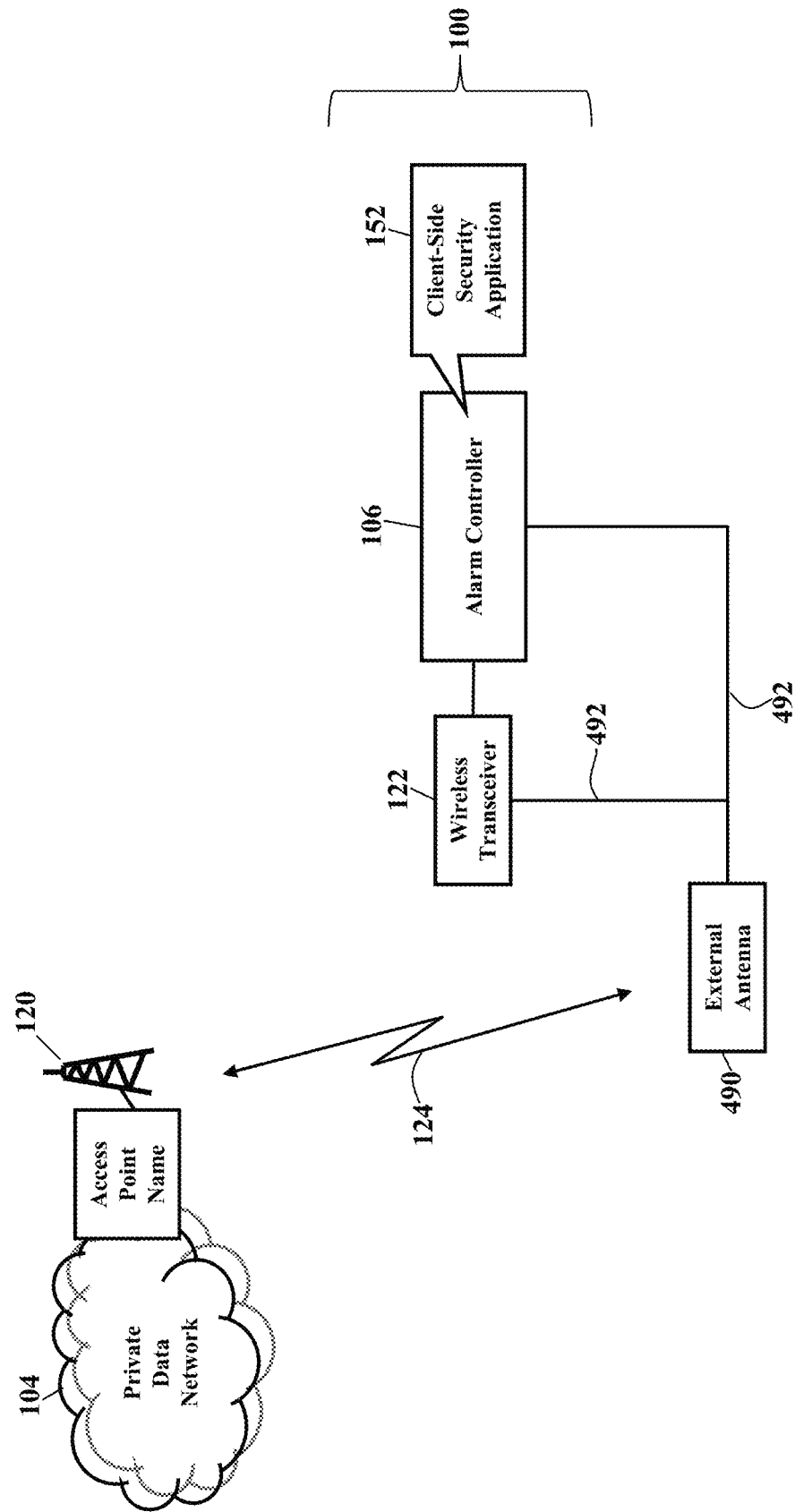
FIG. 25 is a schematic illustrating an external antenna, according to exemplary embodiments.

FIG. 25 is a schematic illustrating an external antenna 490, according to exemplary embodiments. As earlier paragraphs explained, the home or business security system 100 sends and receives using the access point name 120 associated with the private, wireless cellular network connection 124 to the private data network 104. Sometimes, though, the alarm controller 106 is installed, mounted, or located in an area of the home or business that lacks adequate wireless reception or coverage. A basement or closet, for example, may have inadequate signal strength to reliably communicate. The security system 100, then, may interface with the external antenna 490. The external antenna 490 may be mounted in an attic or on a roof to improve wireless reception to the private data network 104. A coaxial cable 492 may connect the external antenna 490 to the wireless transceiver 122 and/or to the alarm controller 106.

Figure 26:
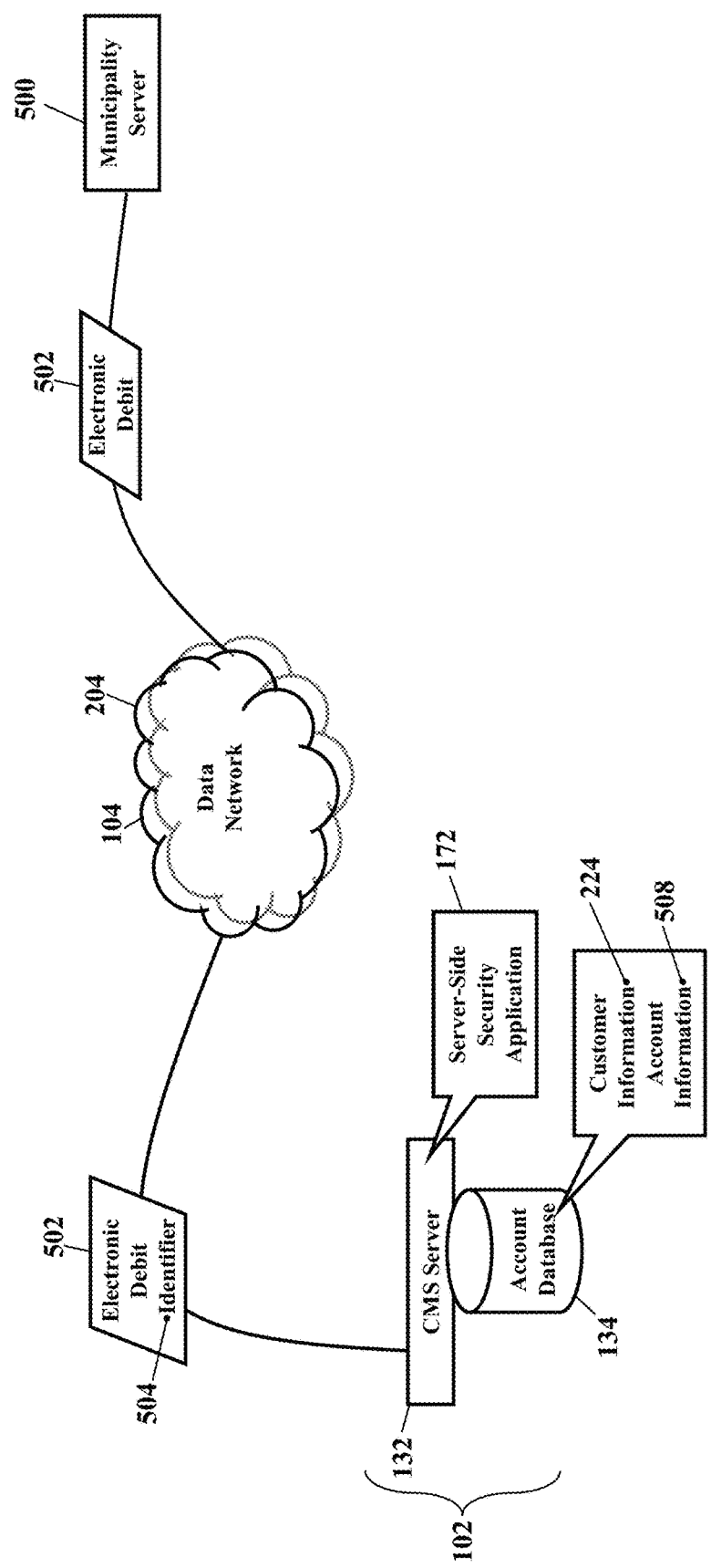
FIG. 26 is a schematic illustrating payment for emergency summons, according to exemplary embodiments.

FIG. 26 is a schematic illustrating payment for emergency summons, according to exemplary embodiments. As this disclosure has explained, one of the primary functions of the agent 136 is to verify alarms truly are emergency situations. Because most alarms are inadvertently triggered, local police and fire departments waste time and resources responding to false alarms. Some municipalities impose fees for each unnecessary dispatch. The agent 136, then, first tries to ascertain a true emergency exists before summoning emergency services. The agent 136 may call the alarm controller 106 to speak with an occupant, and the central monitoring station ("CMS") server 132 may send the alarm notification 226 to friends, family members, and any other authorized network address 220 (as earlier paragraphs explained).

Sometimes, though, verification is unsuccessful. The agent 136 may call the alarm controller 106, but no occupant answers. Even though the alarm notification 226 is sent to friends and family, no response may be received. In these situations, then, the agent 136 may immediately summons emergency services. If the alarm turns out to be a true emergency, then the customer has benefited from the emergency service. If, however, the alarm is false, then emergency personnel have been unnecessarily summoned and financial charges may be imposed.

FIG. 26 thus illustrates a payment scheme. When the alarm is false, an electronic debit 502 is sent. FIG. 26 illustrates a municipality server 500 sending the electronic debit 502 to the central monitoring station server 132 in the central monitoring station 102. The electronic debit 502, though, may optionally be generated by the central monitoring station server 132. The electronic debit 502 may thus be imposed by a municipal government and/or by the server-side security application 172. Regardless, the electronic debit 502 may include the customer information 224 (e.g. name, address, and/or other identifier) associated with a subscriber to emergency services. The server-side security application 172 queries the account database 134 for the customer information 224, and the subscriber database 506 returns account information 508 associated with the customer information 224. The account information 508 may be an account number of a savings or checking account. The account information 508 may additionally or alternatively be a credit card number. Regardless, when the alarm is false, the subscriber has pre-approved debits from, or charges to, the account information 508 for fees imposed for false summons.

Figure 27:
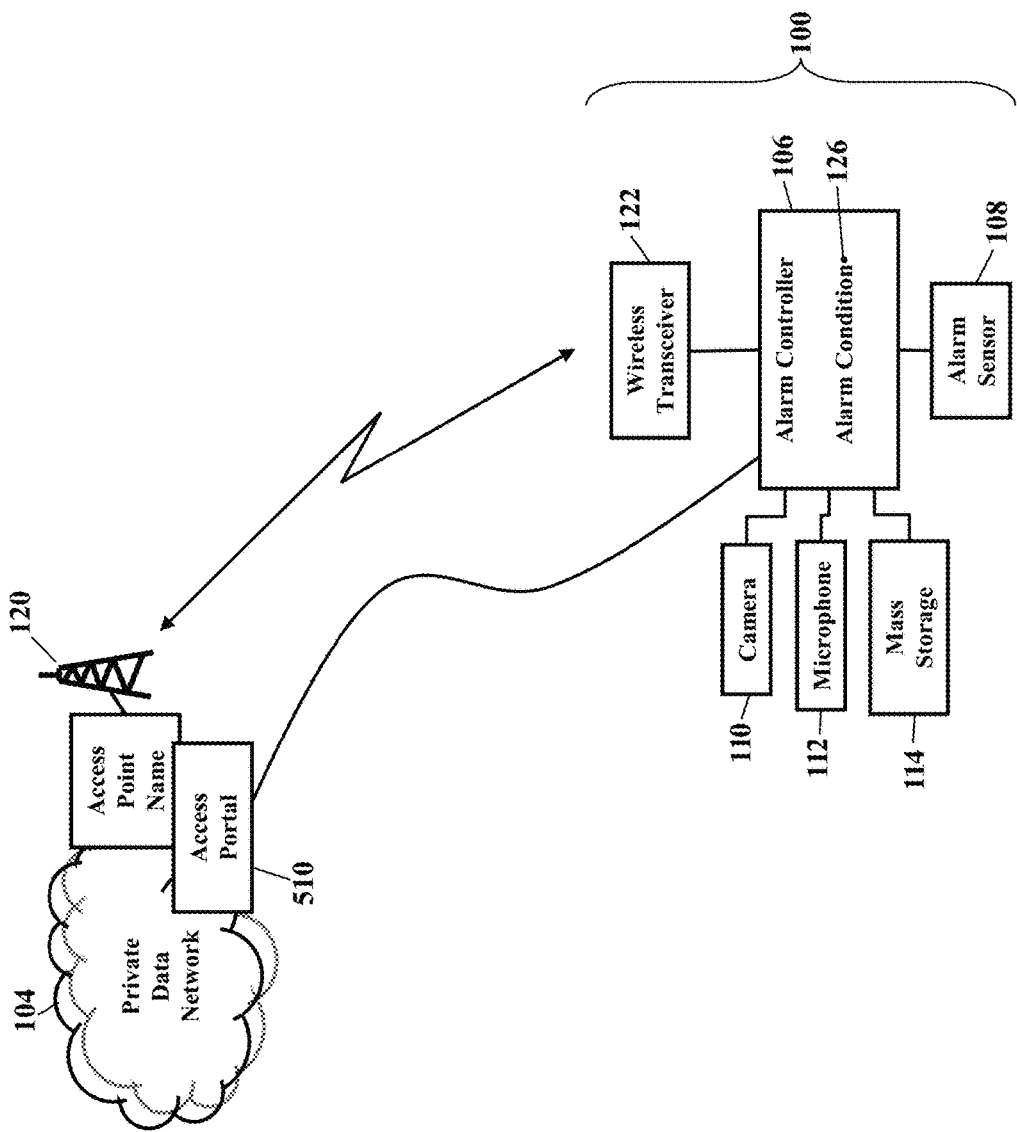
FIG. 27 is a schematic illustrating an access portal, according to exemplary embodiments.

FIG. 27 is a schematic illustrating an access portal 510, according to exemplary embodiments. All communication with the alarm controller 106 may require authentication in the access portal 510. Authentication may be accomplished by providing a valid user name and password. All communication towards the security system 100 may pass through the access portal 510 and then communicate over a secure socket layer (SSL) connection to a customer's home or business. When the customer is away and wishes to access the video data 420 (from any cameras 110), the customer may first authenticate to the access portal 510. If the customer successfully authenticates, the customer's request flows over the secure socket layer (SSL) connection. Likewise, when the agent 126 in the central monitoring center 102 wants to access the camera 110 in the home, the agent 126 may first be authenticated by the access portal 510. The access portal 510 may thus provide a much higher level of security compared to having authentication occur in the alarm controller 106.

Figure 28:
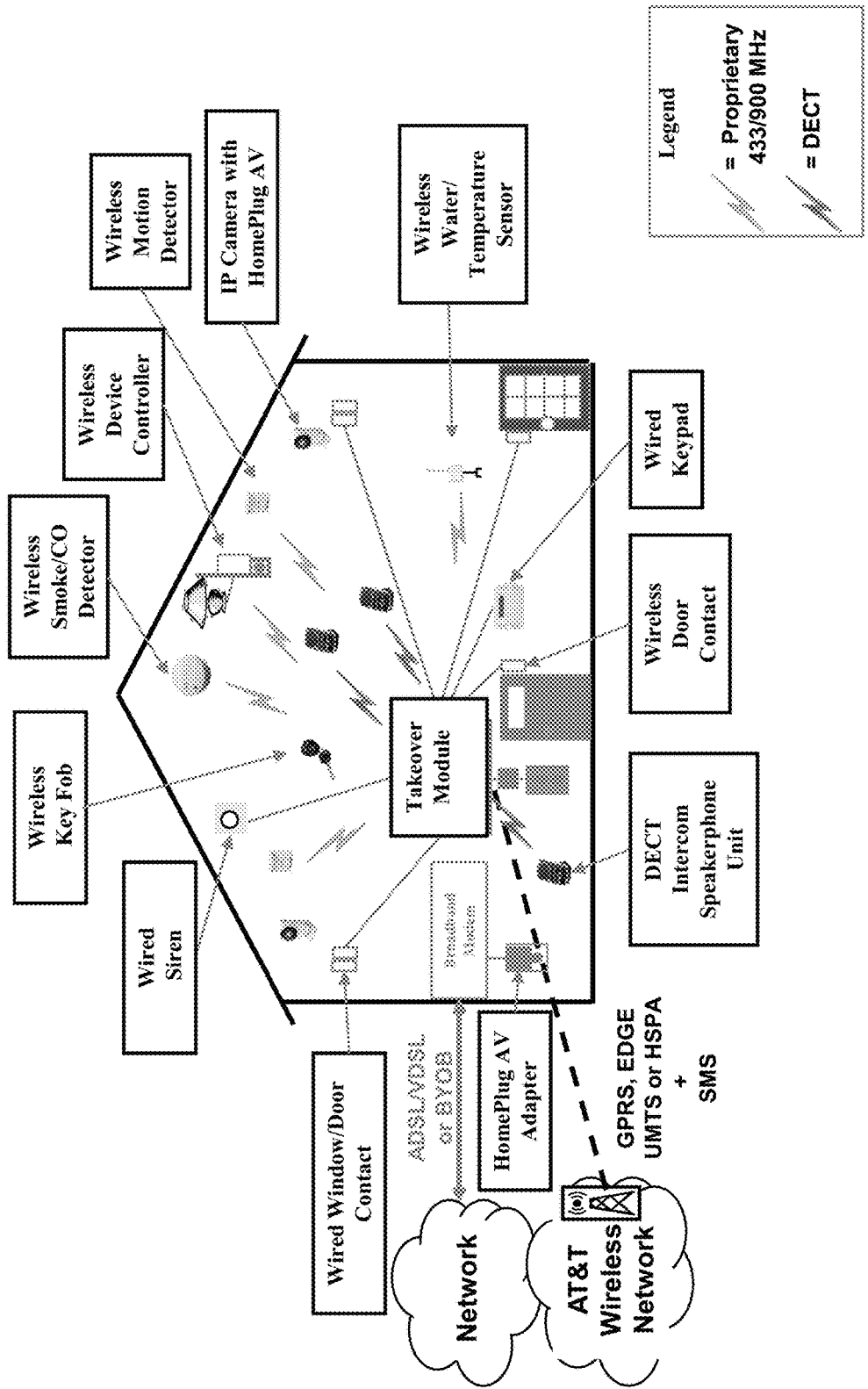
FIG. 28 is a schematic further illustrating the takeover module, according to exemplary embodiments.

FIG. 28 is a schematic further illustrating the takeover module 320, according to exemplary embodiments. The takeover module 320 allows exemplary embodiments to be retrofitted to one or more existing wired sensors and/or wire contacts. As earlier paragraphs explained, conventional security systems have long used wired contacts and sensors to detect security events. Because these existing wired components may still adequately function for basic security services, the takeover module 320 provides an interface to existing wired keypads, sirens, and sensors in older installations. An existing controller may be removed, and the existing circuits may be interfaced to the takeover module 320. The takeover module 320 thus permits older security systems to be up-fitted without incurring substantial installation costs.

Exemplary embodiments thus describe professionally-monitored security services. The alarm controller 106 may have many standard and optional modules, such as:

3G Cellular Data Module (GPRS, EDGE, UMTS and HSPA+SMS);
 24 Hour Battery Backup (Standard)
 433/900 MHz Proprietary Wireless Transceiver Module;
 DECT Base Station Module;
 Takeover Module (Wired Window/Door Contacts, Keypad and Siren Interface); and
 Internal/External Hard Drive.

The alarm controller 106 may be wall mounted in a closet, utility room or basement and preferably adjacent to an AC power outlet. An external cabinet may be molded from plastic for rugged, yet durable, use. The cabinet may be equipped with a securely latched main cabinet door and may be equipped with a backup battery compartment that the customer can access to replace the battery without opening the main cabinet door. The cabinet will support the remote installation of the external 3G/LTE/4G Cellular Data Antenna 490 when there is insufficient signal strength at the location of the cabinet. The cabinet will be equipped with a tamper switch that triggers an alarm if someone attempts to remove the cabinet from the wall when the system is armed or when the main door or battery compartment door is opened.

Figure 31:
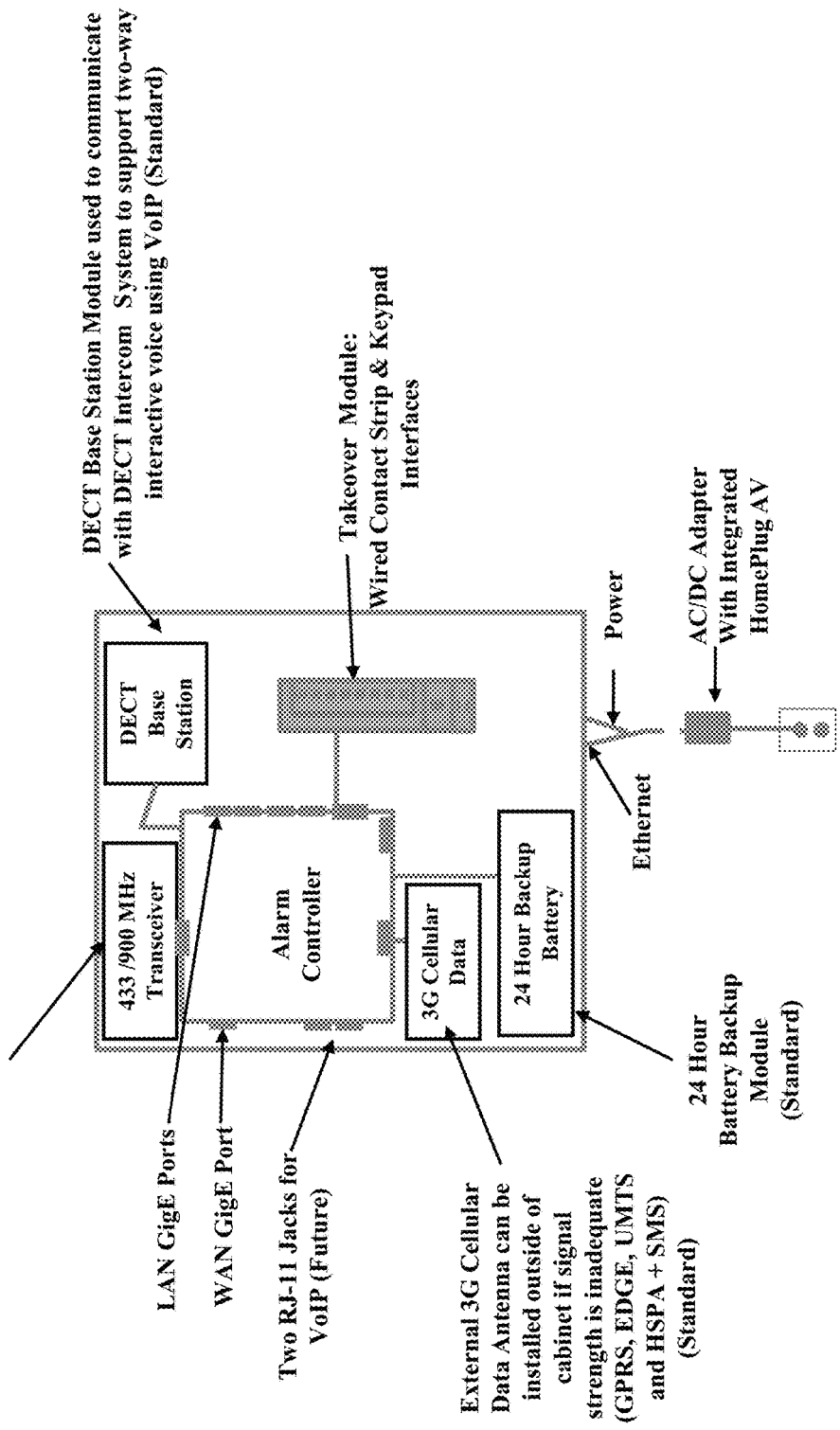

FIGS. 29-33 are schematics further illustrating the alarm controller 106, according to exemplary embodiments. FIG. 30 illustrates exterior features of the alarm controller 106, while FIG. 31 illustrates interior components of the alarm controller 106. FIG. 32 illustrates a logical table of indicators that are visible on a front of the security cabinet, while FIG. 33 lists external sensors, contacts, and other components.

Figure 34:
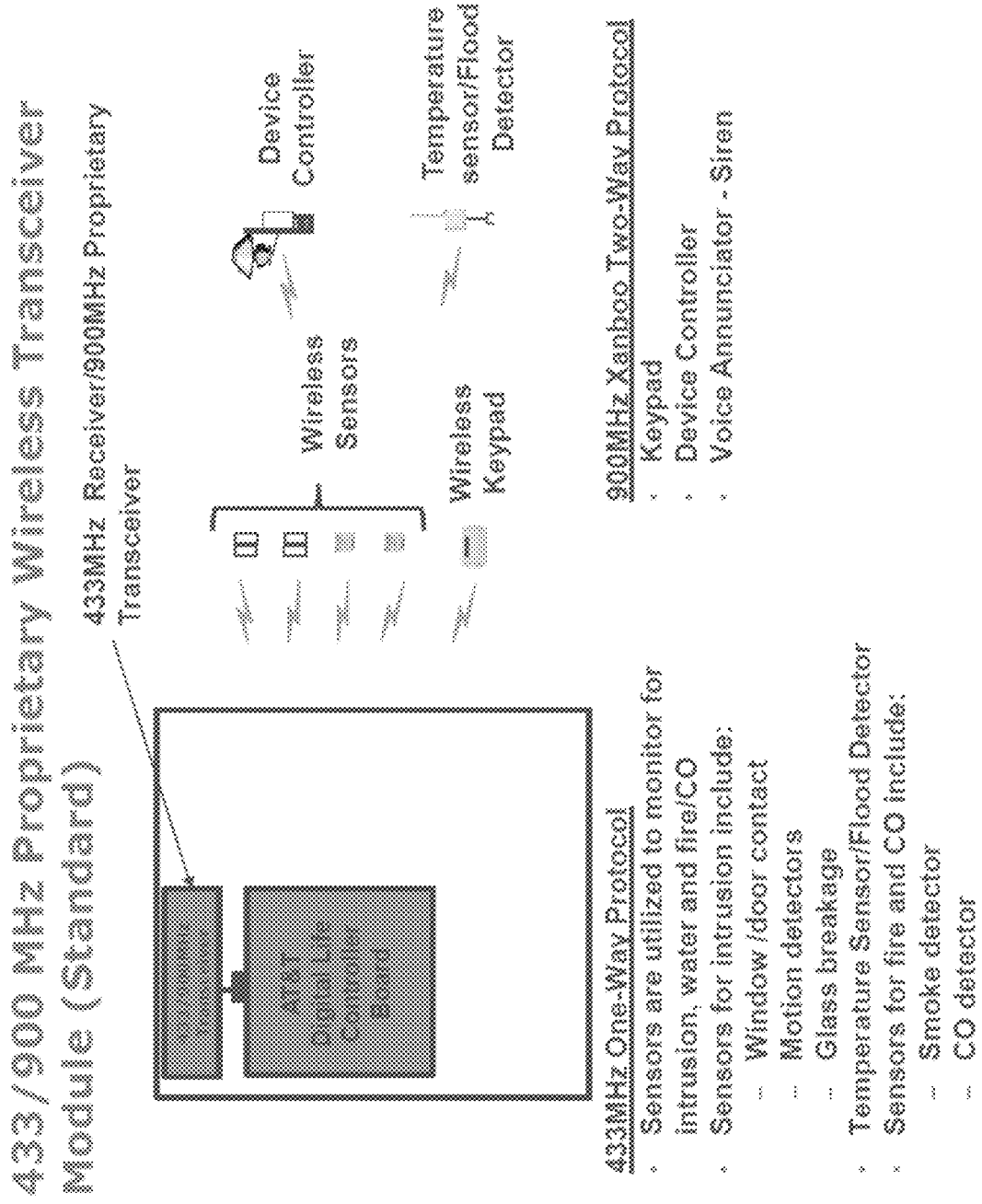

FIGS. 34-36 are schematics further illustrating the alarm controller 106, according to exemplary embodiments. FIG. 34 illustrates the wireless transceiver 122, while FIG. 35 further illustrates the battery 274. FIG. 36 illustrates an optional hard drive.

The alarm controller 106 is installed and placed in a "wireless/wired device discovery" mode. The wired and wireless sensors 108 to be discovered, such as window contacts, door contacts, motion detectors, keypads, sirens, smoke/CO detectors and IP cameras, are each placed in the "discoverable" mode. The alarm controller 106 causes the wireless transceiver 122 to broadcast a device discovery request. Each sensor 108 receives the device discovery request and responds. As each sensor 108 is discovered, the sensor 108 is registered with the alarm controller 106. After all of the wireless and wired sensors 108 have been discovered, the alarm controller 106 is taken out of the "wireless/wired device discovery" mode. After device discovery has been completed, a complete record of all of the registered devices is stored in the memory of the alarm controller 106, and a copy of the record is automatically sent to a central repository (such as the central monitoring station server 132) and stored with the customer's account.

Figure 37:
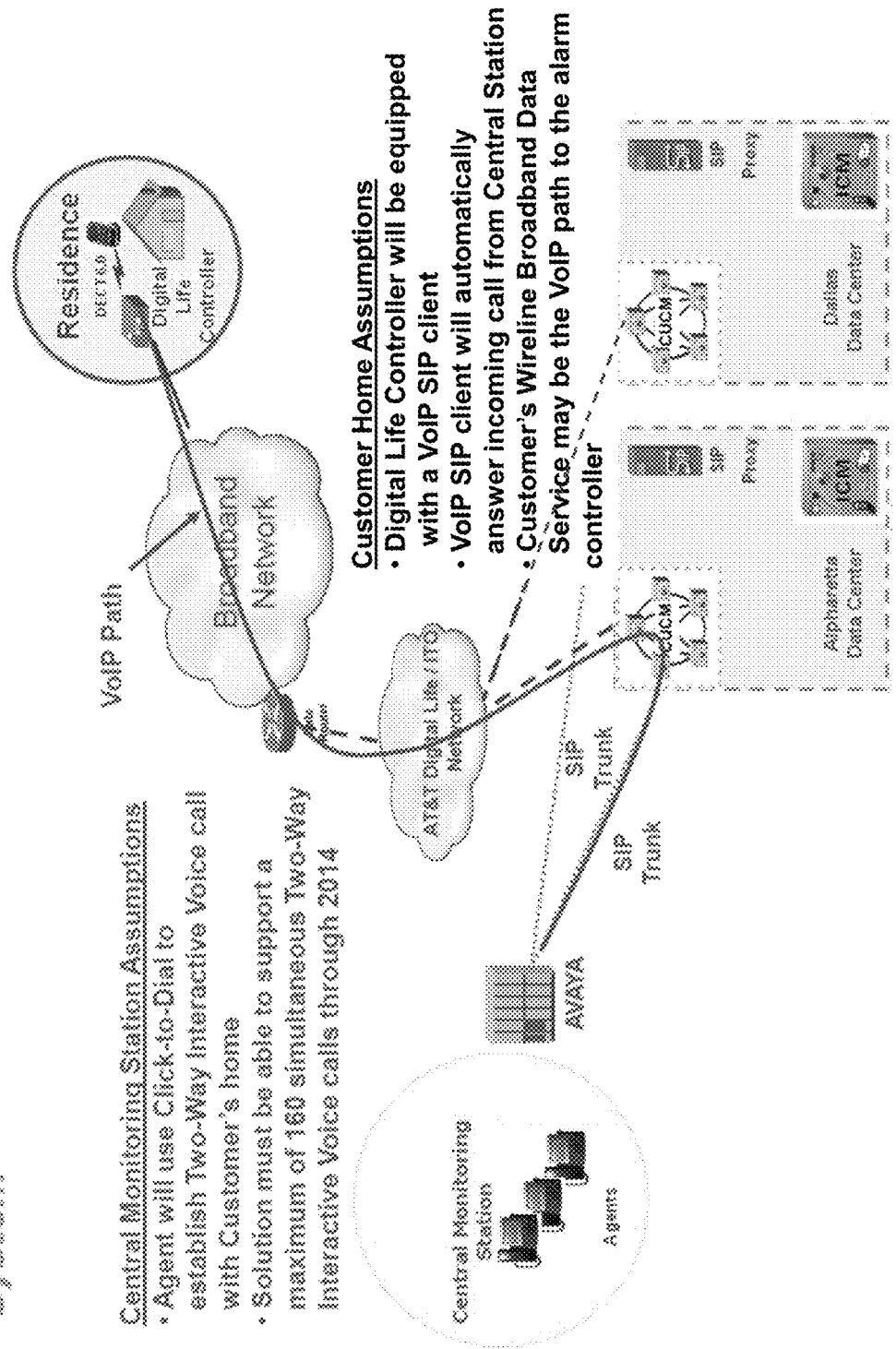
Figure 38:
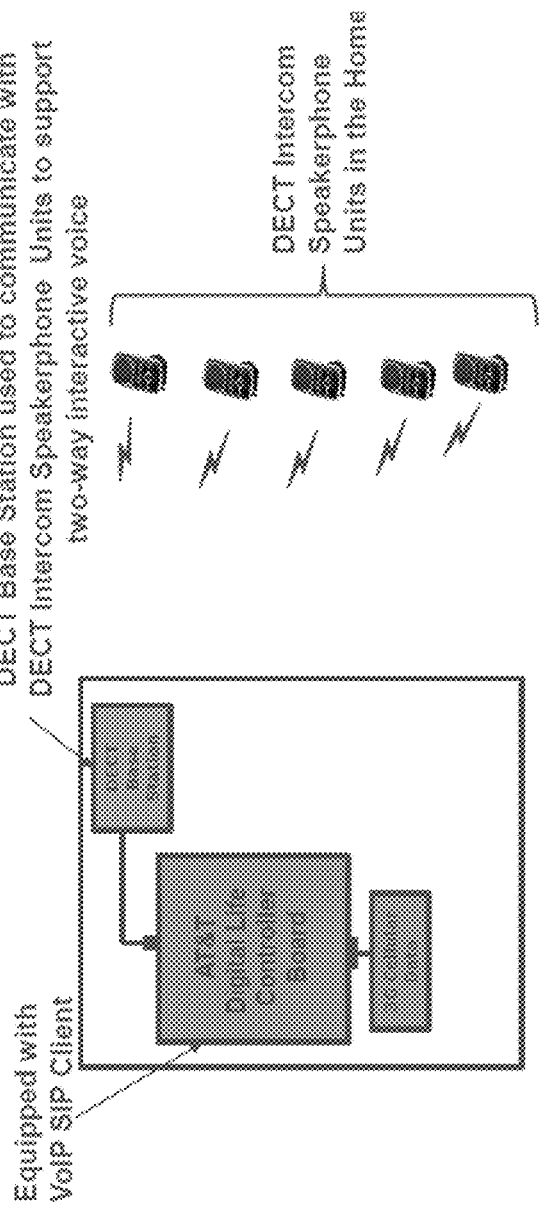
Figure 39:
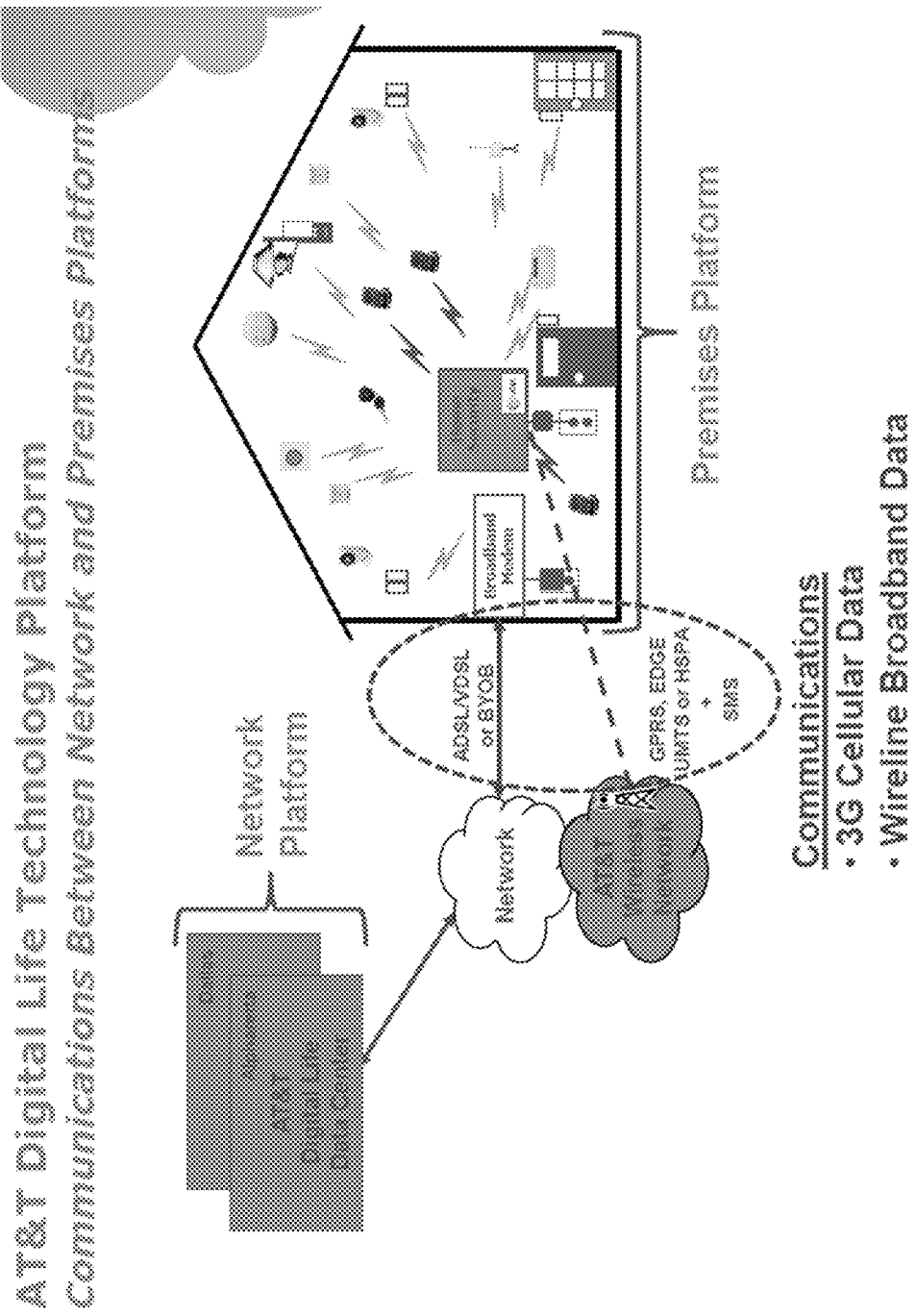
Figure 41:
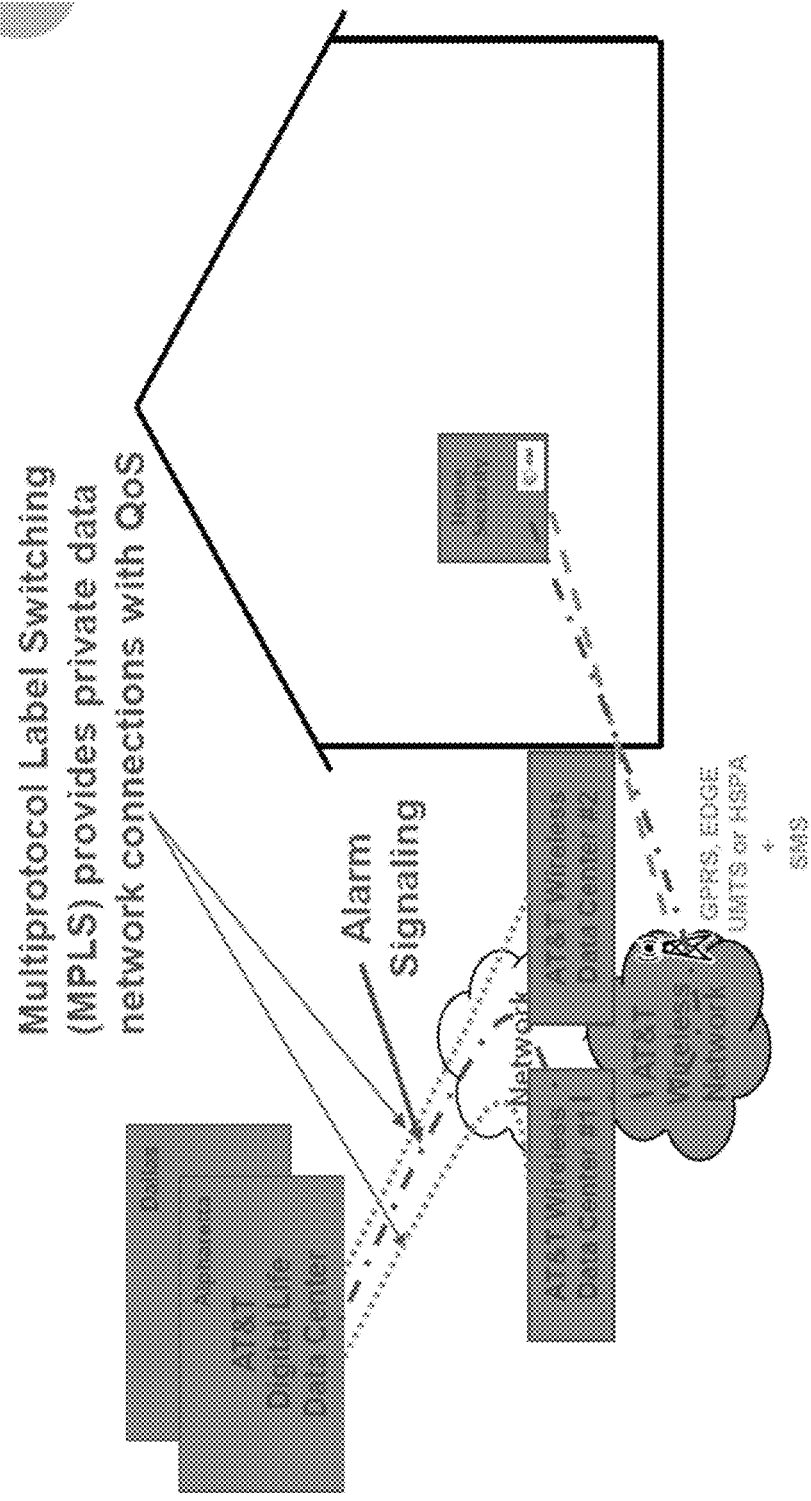
Figure 42:
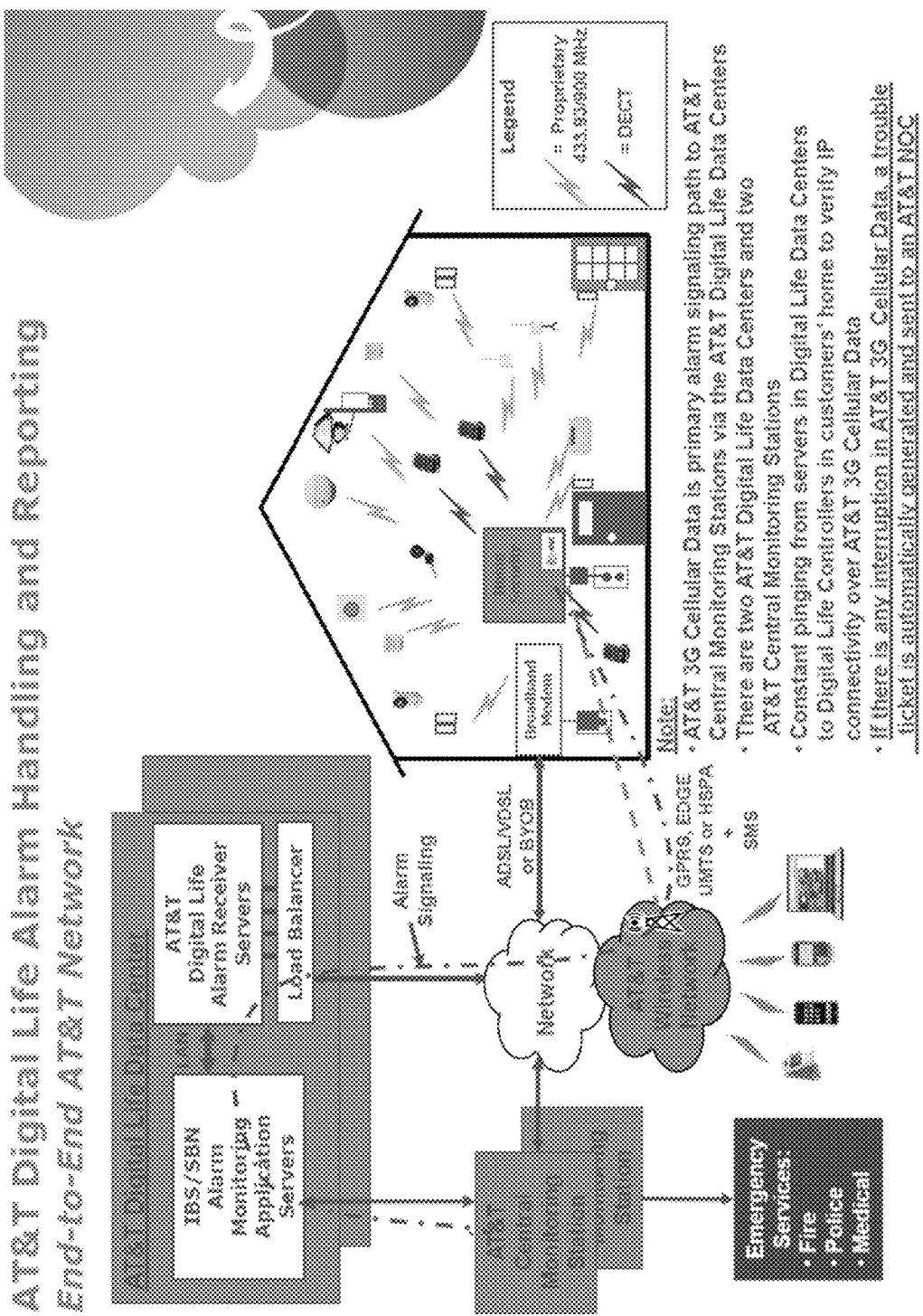

FIGS. 37-42 are schematics further illustrating verification of alarms, according to exemplary embodiments. FIG. 37 illustrates a routing scheme for the Voice-over Internet Protocol call 140 to the alarm controller 106. FIG. 38 illustrates the base station 202 and the portable units 200. FIG. 39 illustrates communications paths available to the alarm controller 106, while FIG. 40 illustrates a table of operating modes and communications paths. FIG. 41 is a detailed schematic of the wireless cellular network connection 124, while FIG. 42 illustrates alarm handling and reporting.

Figure 43:
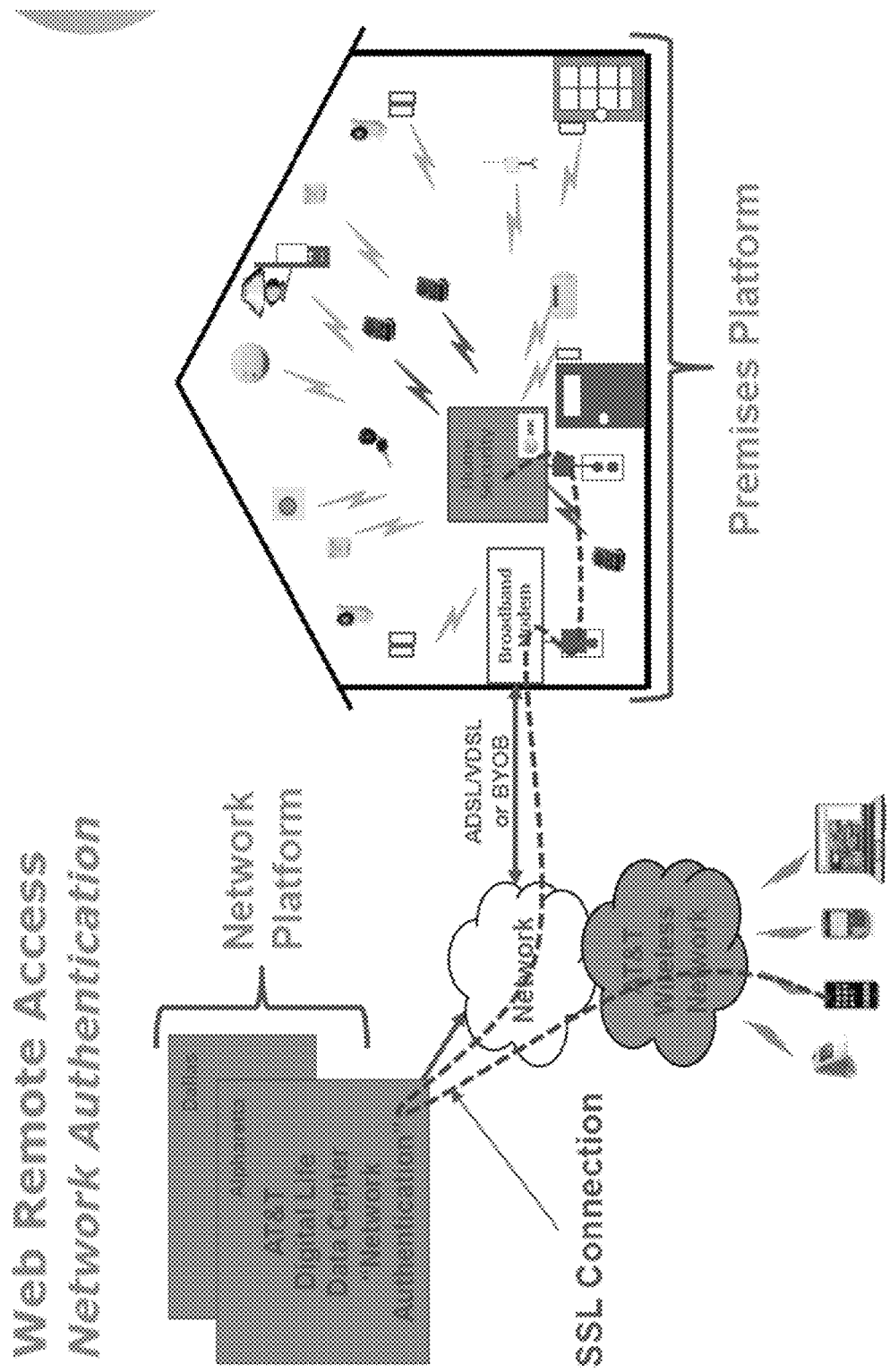
FIGS. 43-44 are more schematics illustrating security services, according to exemplary embodiments.
Figure 44:
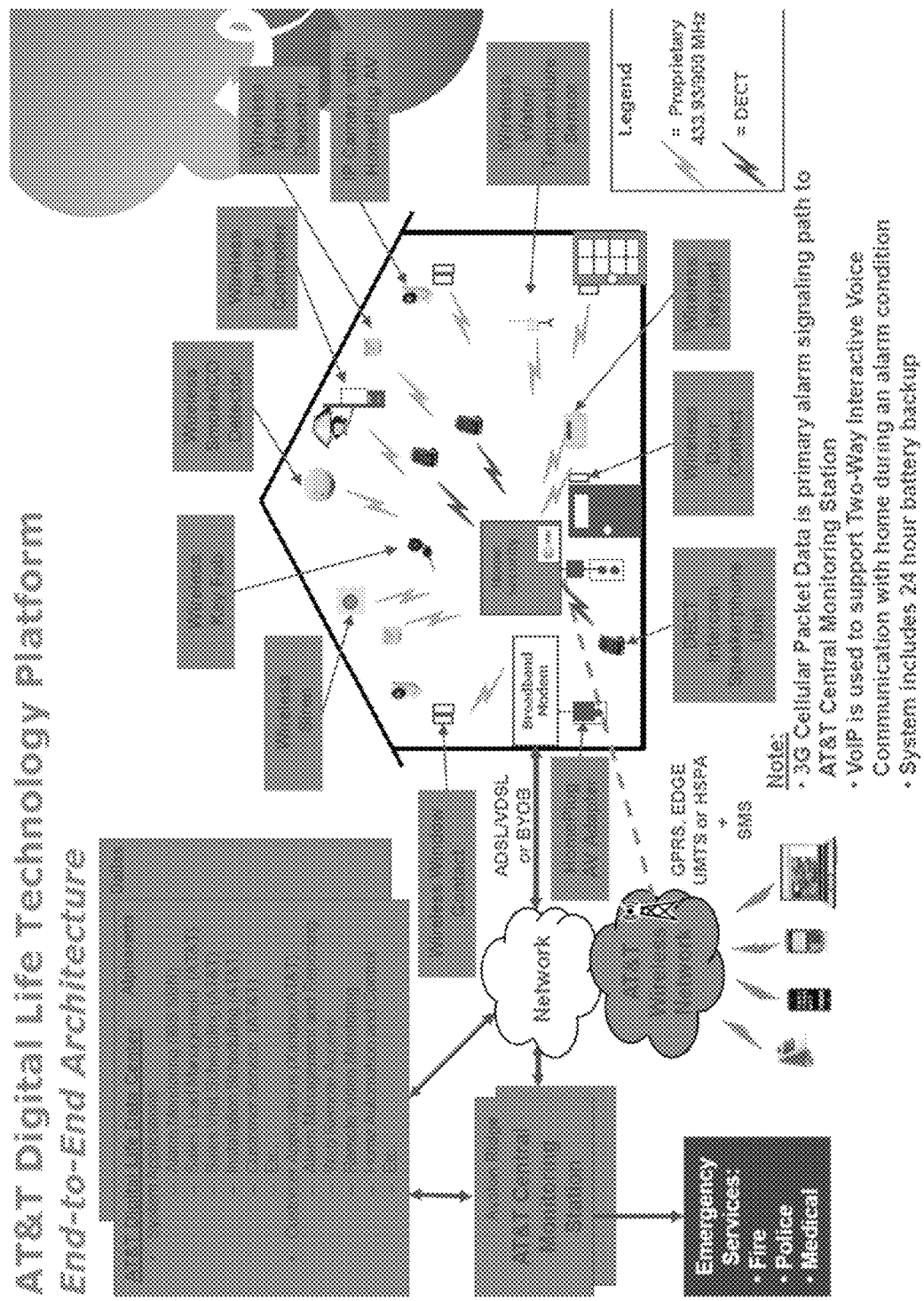

FIGS. 43-44 are more schematics illustrating security services, according to exemplary embodiments. FIG. 43 illustrates remote access, while FIG. 44 illustrates a general network architecture.

Exemplary embodiments may be applied regardless of networking environment. The private data network 104 may be a cable network operating in the radio-frequency domain and/or the Internet Protocol (IP) domain. The data network 104 may include coaxial cables, copper wires, fiber optic lines, and/or hybrid-coaxial lines. The data network 104 may also include wireless portions utilizing any portion of the electromagnetic spectrum and any signaling standard, as previous paragraphs explained. The concepts described herein may be applied to any wireless/wireline communications network, regardless of physical componentry, physical configuration, or communications standard(s).

Figure 45:
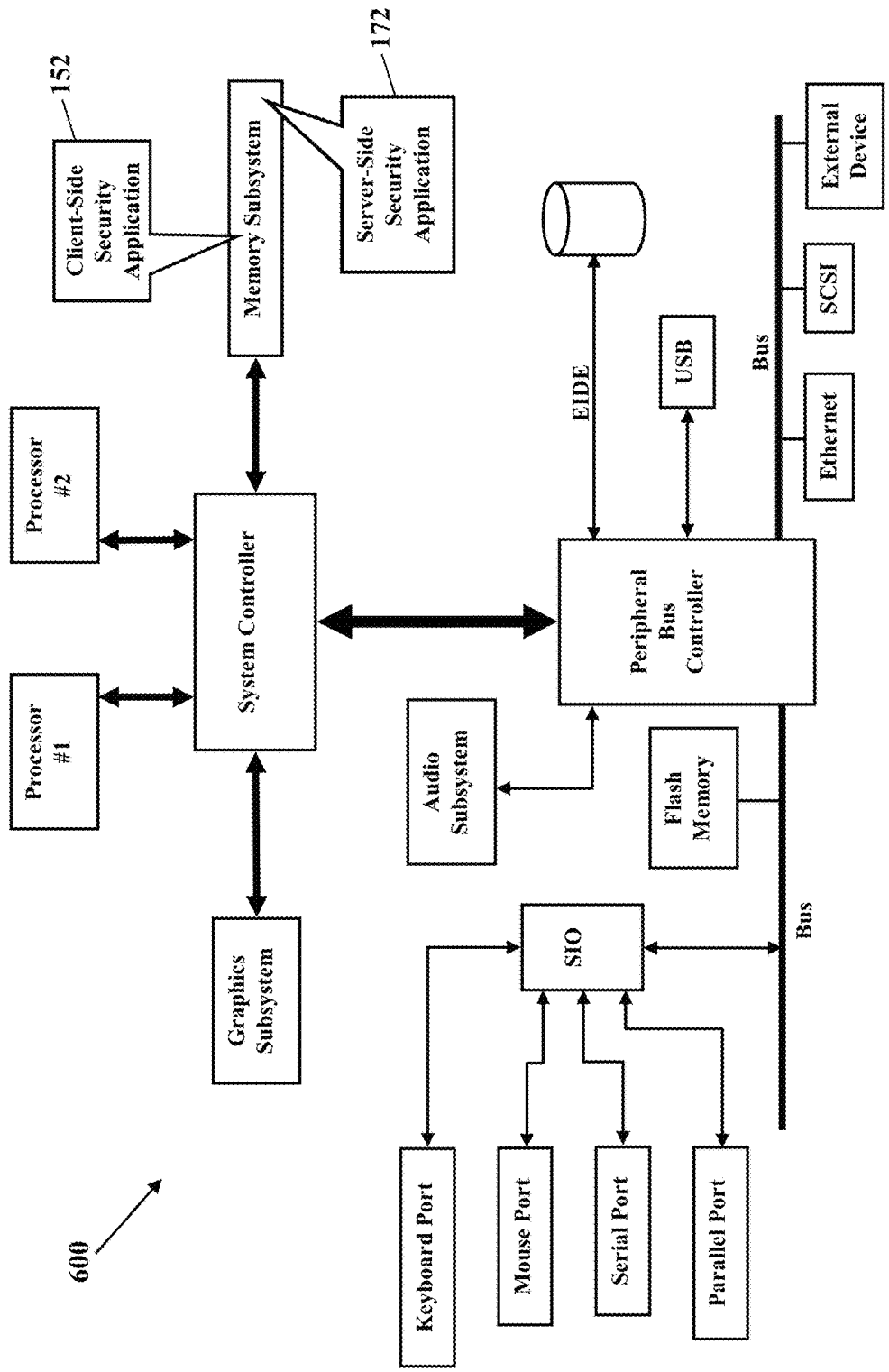
FIG. 45 is a block diagram illustrating a processor-controlled device, according to exemplary embodiments.

FIG. 45 is a schematic illustrating still more exemplary embodiments. FIG. 45 is a generic block diagram illustrating the client-side security application 152 and/or the server-side security application 172 may operate within a processor-controlled device 600. The client-side security application 152 and/or the server-side security application 172 may be stored in a memory subsystem of the processor-controlled device 600. One or more processors communicate with the memory subsystem and execute the client-side security application 152 and/or the server-side security application 172. Because the processor-controlled device 600 illustrated in FIG. 45 is well-known to those of ordinary skill in the art, no detailed explanation is needed.

Exemplary embodiments may be physically embodied on or in a computer-readable storage medium. This computer-readable medium may include a hard drive, USB drive, CD-ROM, DVD, tape, cassette, floppy disk, memory card, and large-capacity disks. This computer-readable medium, or media, could be distributed to end-subscribers, licensees, and assignees. A computer program product comprises a computer readable medium storing processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a hardware processor; and
a memory device, the memory device storing instructions, the instructions when executed causing the hardware processor to perform operations, the operations comprising:
receiving a message specifying an identifier of an open circuit detected by a takeover module of a security system;
identifying a camera that is associated with the identifier of the open circuit detected by the takeover module;
retrieving a video data generated by the camera that is associated with the identifier of the open circuit detected by the takeover module; and
sending the video data to a destination to alert of the open circuit detected by the takeover module.

2. The system of claim 1, wherein the operations further comprise querying the camera to retrieve the video data.

3. The system of claim 1, wherein the operations further comprise instructing the camera to generate the video data.

4. The system of claim 1, wherein the operations further comprise determining an address associated with the camera.

5. The system of claim 1, wherein the operations further comprise determining a destination address associated with the destination.

6. The system of claim 1, wherein the operations further comprise determining an alarm condition based on the open circuit.

7. The system of claim 1, wherein the operations further comprise determining an alarm condition based on the video data.

8. A method of video surveillance, comprising:
receiving, by a controller associated with a security system, a message specifying an identifier of an open circuit detected by a takeover module;
identifying, by the controller, a camera that is associated with the identifier of the open circuit detected by the takeover module;
retrieving, by the controller, a video data generated by the camera that is associated with the identifier of the open circuit detected by the takeover module; and
sending, by the controller, the video data to a destination to alert of the open circuit detected by the takeover module.

9. The method of claim 8, further comprising querying the camera to retrieve the video data.

10. The method of claim 9, further comprising instructing the camera to generate the video data.

11. The method of claim 9, further comprising determining an address associated with the camera.

12. The method of claim 9, further comprising determining a destination address associated with the destination.

13. The method of claim 9, further comprising determining an alarm condition based on the open circuit.

14. The method of claim 9, further comprising determining an alarm condition based on the video data.

15. A memory device storing instructions that when executed cause a hardware processor to perform operations, the operations comprising:
receiving a message specifying an identifier of an open circuit detected by a takeover module of a security system;
identifying a camera that is associated with the identifier of the open circuit detected by the takeover module;
retrieving a video data generated by the camera that is associated with the identifier of the open circuit detected by the takeover module; and sending the video data to a destination to alert of the open circuit detected by the takeover module.

16. The memory device of claim 15, wherein the operations further comprise querying the camera to retrieve the video data.

17. The memory device of claim 15, wherein the operations further comprise instructing the camera to generate the video data.

18. The memory device of claim 15, wherein the operations further comprise determining an address associated with the camera.

19. The memory device of claim 15, wherein the operations further comprise determining a destination address associated with the destination.

20. The memory device of claim 15, wherein the operations further comprise determining an alarm condition based on the open circuit.

* * * * *